US009647474B2

(12) United States Patent
Fathollahi et al.

(10) Patent No.: US 9,647,474 B2
(45) Date of Patent: May 9, 2017

(54) PROTECTIVE CASE FOR MOBILE DEVICE WITH AUXILIARY BATTERY AND POWER CONTROL

(71) Applicant: Incipio Technologies, Inc., Irvine, CA (US)

(72) Inventors: Andy Fathollahi, Corona Del Mar, CA (US); Yu Ta Lin, Temple City, CA (US); Jin Woo Choi, Irvine, CA (US)

(73) Assignee: Incipio, LLC, Irvine, CA (US)

( * ) Notice: Subject to any disclaimer, the term of this patent is extended or adjusted under 35 U.S.C. 154(b) by 385 days.

(21) Appl. No.: 14/588,876

(22) Filed: Jan. 2, 2015

(65) Prior Publication Data
US 2015/0194833 A1    Jul. 9, 2015

Related U.S. Application Data

(60) Provisional application No. 61/924,198, filed on Jan. 6, 2014.

(51) Int. Cl.
*H02J 7/00* (2006.01)
*H04M 1/04* (2006.01)

(52) U.S. Cl.
CPC .......... *H02J 7/0044* (2013.01); *H02J 7/0047* (2013.01); *H02J 7/0054* (2013.01); *H02J 2007/005* (2013.01); *H02J 2007/0062* (2013.01); *H02J 2007/0096* (2013.01); *H04M 1/04* (2013.01)

(58) Field of Classification Search
CPC .................................................. H02J 7/0044
USPC ....................................................... 320/114
See application file for complete search history.

(56) References Cited

U.S. PATENT DOCUMENTS

| 7,199,554 B2 | 4/2007 | Kim et al. |
| D556,681 S | 12/2007 | Kim |
| D561,092 S | 2/2008 | Kim |

(Continued)

FOREIGN PATENT DOCUMENTS

| JP | 2001-093586 | 4/2001 |
| KR | 10-2011-0040622 | 4/2001 |

*Primary Examiner* — Yalkew Fantu
(74) *Attorney, Agent, or Firm* — Manatt, Phelps & Phillips, LLP

(57) ABSTRACT

A protective case for a mobile device is disclosed. The case includes an additional power source (i.e., a battery) that can supply electric current to the mobile device. A processing device within the protective case may be wirelessly connected to the mobile device, such as with a Bluetooth interface, and thereby control operational aspects of the battery case, including for example control over supplying power to the mobile device. The battery case may be part of a charging system or kit that includes a uniquely designed separate charger. In yet another aspect, the protective case may include unitary bumper flexible bumper co-molded to the body of the case and a male connector extending from a nested portion that is adapted to tilt outward from the case to facilitate insertion of the corresponding female port on the mobile device into the connector and into the case. The protective case may also include a stand in the form of dock or cradle to allow positioning and/or charging of the battery case and mobile device via external contact terminals correspondingly positioned on the outside of the case and in the cavity of the cradle.

16 Claims, 37 Drawing Sheets

(56) References Cited

U.S. PATENT DOCUMENTS

| | | | |
|---|---|---|---|
| 7,375,967 B2 * | 5/2008 | Huang | G06F 1/203 |
| | | | 165/104.33 |
| 7,479,759 B2 * | 1/2009 | Vilanov | H02J 7/0044 |
| | | | 320/103 |
| 7,612,997 B1 | 11/2009 | Diebel et al. | |
| 7,638,969 B2 | 12/2009 | Woud | |
| 7,782,610 B2 * | 8/2010 | Diebel | G06F 1/1628 |
| | | | 361/679.41 |
| 7,889,498 B2 | 2/2011 | Diebel et al. | |
| 8,013,572 B2 | 9/2011 | Rodgers | |
| 8,183,825 B2 * | 5/2012 | Sa | H02J 7/0044 |
| | | | 320/107 |
| 8,390,255 B1 | 3/2013 | Fathollahi | |
| 9,071,060 B2 | 6/2015 | Fathollahi | |
| 2003/0218445 A1 | 11/2003 | Behar | |
| 2007/0152633 A1 * | 7/2007 | Lee | G06F 1/1632 |
| | | | 320/114 |
| 2011/0159324 A1 | 6/2011 | Huang et al. | |
| 2011/0199041 A1 * | 8/2011 | Yang | H01M 10/46 |
| | | | 320/101 |
| 2011/0234152 A1 | 9/2011 | Frossen | |
| 2012/0196658 A1 | 8/2012 | Sun | |

\* cited by examiner

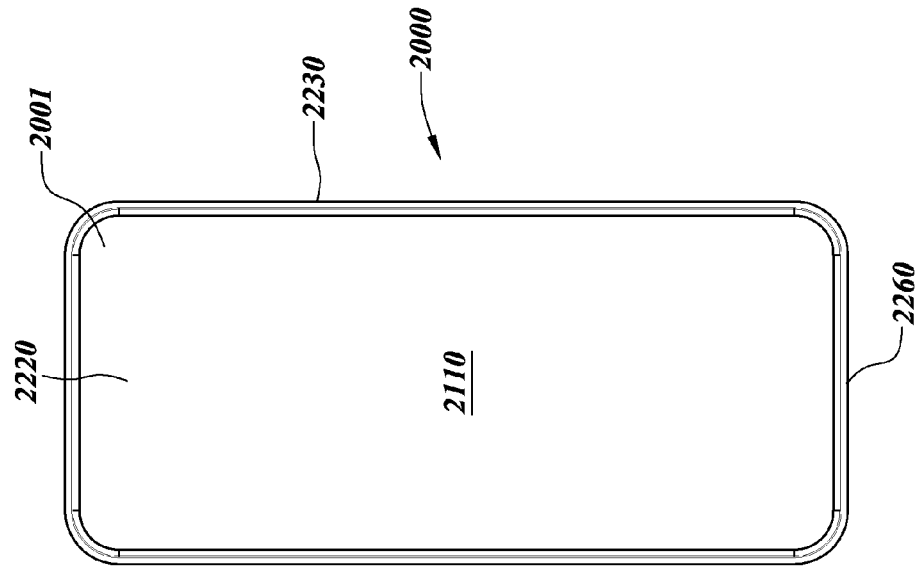
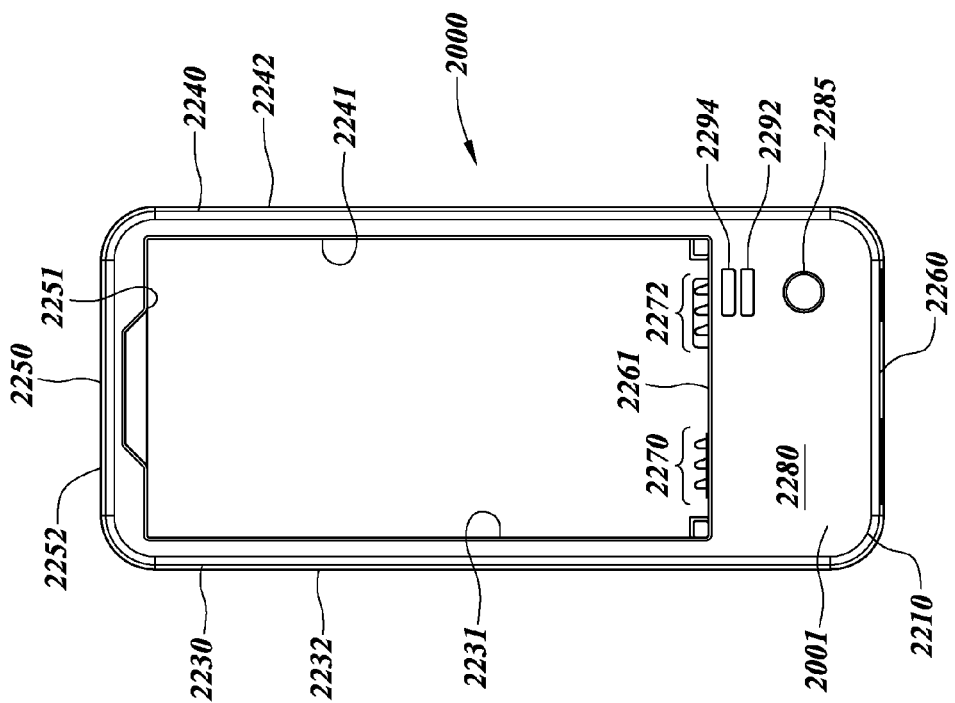

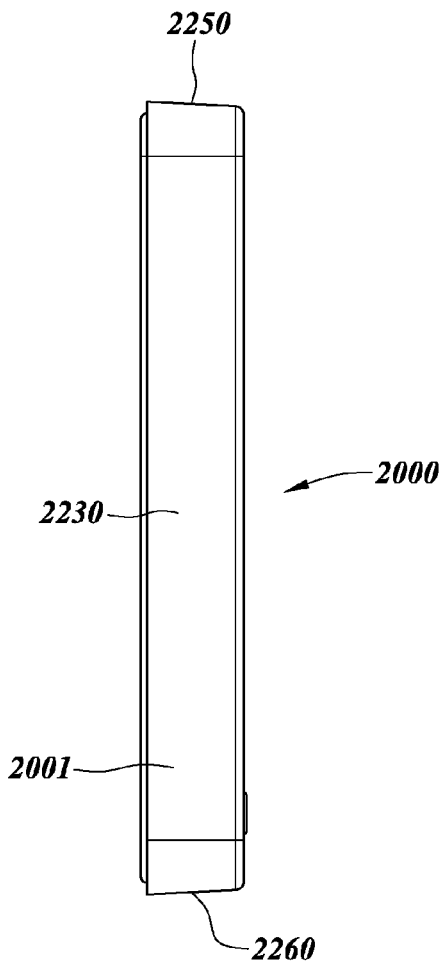
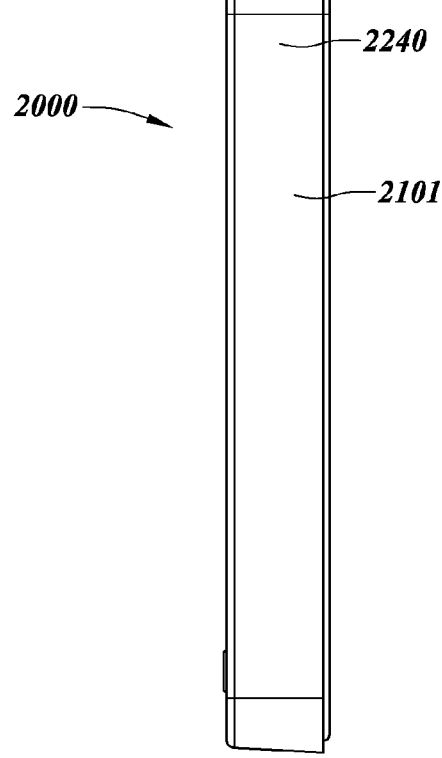
FIG. 14C
FIG. 14D
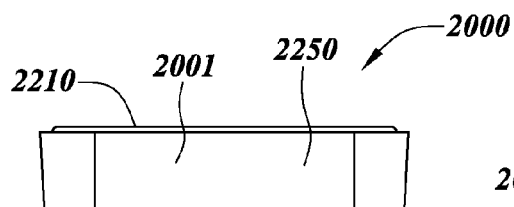
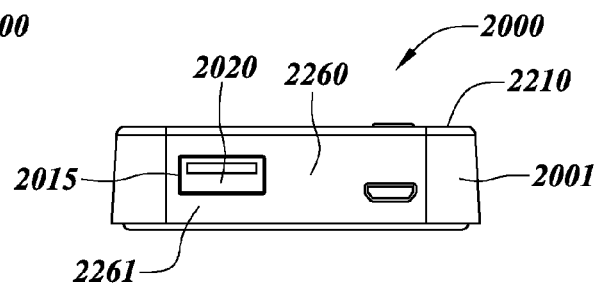
FIG. 14E
FIG. 14F

PROTECTIVE CASE FOR MOBILE DEVICE WITH AUXILIARY BATTERY AND POWER CONTROL

INCORPORATION BY REFERENCE TO RELATED APPLICATIONS

This application claims benefit under 35 U.S.C. §119(e) from U.S. Provisional Application No. 61/924,198, filed on Jan. 6, 2014, the disclosure of which is incorporated herein by reference in its entirety, except for the Abstract set forth on page 51 thereof. This application is related to U.S. application Ser. No. 13/489,325, filed Jun. 5, 2012, now U.S. Pat. No. 8,390,255, which claims the benefit of U.S. Provisional Appl. No. 61/651,981, filed May 25, 2012.

BACKGROUND

Field of the Invention

This patent document relates to user removable protective enclosures or cases for mobile devices. More particularly the subject matter of this patent document relates to such cases that include auxiliary battery capacity.

Description of the Related Art

Mobile devices are known to sustain damage from impact, such as from a fall or being dropped by a user and from contamination, such as when damaged by water or other fluid. The damage, for example, may result in a cracked screen, scratches on a finished surface, lost or damaged buttons or controls, cracked or bent external body components, and/or failed or malfunctioning electrical components. Cases have thus been provided to protect mobile devices from such and variant types of damage.

Protective cases with integrated batteries are available. Typically, such cases have a battery cell or cells within the case, along with power supply terminals that are inserted into the mobile device's data and battery charging port. In certain devices, the data battery charging port comprises a female USB port. In other mobile devices such as the iPhone® 5 by Apple®, a proprietary data and charging port is used. (iPhone and Apple are trademarks of Apple Inc.) In either case, electrical current is supplied by the internal battery of the case to the mobile device in such a way that the mobile device operates as if the current supplied is from a battery charging power supply instead of the auxiliary battery. The protective case can be arranged to have permanently installed battery cell(s), or can be arranged to so that the battery cell(s) can be user replaceable.

In certain protective cases with auxiliary batteries, the user of the mobile device uses a mechanical switch to manually select which battery powers the mobile device, either the internal battery of the mobile device, or the auxiliary battery internal to the protective case. In other protective cases, an app, i.e., a software application, executing on the mobile device monitors mobile device usage patterns, and sends usage data, including the amount of charge left in the battery in the mobile device to a processing device in the protective case. The processing device in the protective case then determines when to enable supply of current from the battery of the protective case, through the data and charging port, and into the mobile device, for charging of the mobile device battery.

The ability of processing device of the protective case to accurately determine when to enable the supply of current from the protective case's battery to the mobile device's battery is directly related to the accuracy of the data supplied by the mobile device. Unfortunately, the battery condition data (e.g., the amount of charge left in the battery) supplied through the data and charging port of most mobile devices, including the Apple® iPhone® and most Android™-based devices is unreliable. (Android is a trademark of Google Inc.) When the processing device of the protective case having an auxiliary battery receives inaccurate battery condition data, it can enable the supply of current either too soon or too late. Both situations are problematic. For example, to obtain the maximum amount to time for using the mobile device, it is desirable to delay enablement of the auxiliary battery for as long as possible, since it is known that most mobile devices consume more power when run on external power supplies. Likewise, if the supply of current from the auxiliary battery is delayed too long, the mobile device can exhaust its battery before the auxiliary supply of current is enable, thus leading to the device shutting down.

Additionally, because battery cases require a male plug that connects to the female power port or connector of the mobile device, conventional battery cases typically are comprised of a base portion and separate perimeter portion to facilitate insertion of the mobile device in the case. As a result, it is not uncommon for the case to separate (e.g., the bumper portion to dislodge or fall off) when the case is dropped.

Accordingly, it is here recognized that there is a need for protective cases for mobile devices that have an auxiliary battery that can supply electric current to the mobile device, and where the protective case is arranged to receive accurate data regarding the condition of the mobile device's battery.

SUMMARY

There exists a continuing need for new and improved designs for cases for mobile devices that provide protection to the mobile device while also providing displaced user control over the operation of the mobile device.

Disclosed is a unique and inventive protective case configured to receive and protect a mobile device wherein said case includes an additional power source (i.e., a battery) that can supply electric current to the mobile device. In one aspect a processing device within the protective case is wirelessly connected to the mobile device, such as with a Bluetooth interface such as a Bluetooth low energy ("BLE") interface. (Bluetooth is a trademark of Bluetooth SIG, Inc.) While BLE may be employed to implement the connectivity between the case and the mobile device, it should be understood that any suitable wireless interface is may be used, including standard Bluetooth or industrial, scientific and medical (ISM) radio bands for RF. In yet another further aspect, the protective case may be formed of one or more enclosure components that individually or collectively securely surround, in whole or in part, the mobile device and/or perimeter thereof. When formed of multiple components, the components may be adapted to being connected to one another in a reversible locking connection. A unitary construction formed of a rigid component co-molded to a relatively less rigid and more elastic component that forms the bumper and one or both end regions of the case is also disclosed. In yet a further aspect, the protective case may also include a stand formed as a cradle or dock that receives the bottom end region of the case and supports it on end so that the case is in a generally upright position. When the case is inserted in the dock, the dock can charge or power the case via an external power source connected thereto. The dock and case are provided with external charging connector pins or terminals (as opposed to male and female connector plugs and ports), to facilitate charging and ease of insertion and removable from the charging dock or cradle.

Each of the foregoing various aspects, together with those set forth in the claims and described in connection with the embodiments of the protective cases summarized above disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIGS. 14A-14F are various plan views of a battery charger.

FIGS. 1-12 and the corresponding written description set forth above and below were disclosed in commonly owned U.S. application Ser. No. 13/489,325, filed Jun. 5, 2012, now U.S. Pat. No. 8,390,255 issued on Mar. 5, 2015, which claims the benefit of U.S. Provisional Appl. No. 61/651,981, filed May 25, 2012.

DETAILED DESCRIPTION

Disclosed herein is a protective case for a mobile device configured to supply auxiliary electric current to a mobile device so as to increase time the mobile device can be used before recharging is necessary. The protective case comprises a battery case for a mobile device and kit comprising the battery case, rechargeable batteries, a battery charger, and wireless control circuitry is disclosed herein. The embodiments disclosed herein are described in the context of a battery case for an Apple® iPhone® mobile device because the embodiments disclosed herein have particular utility in this context. However, the embodiments and inventions herein can also be applied to other types of electronic devices, including, but not limited to tablets, PDAs, e-readers, MP3 players (such as an iPod®), laptops, etc. (iPod is a trademark of Apple Inc.)

Figure 2:
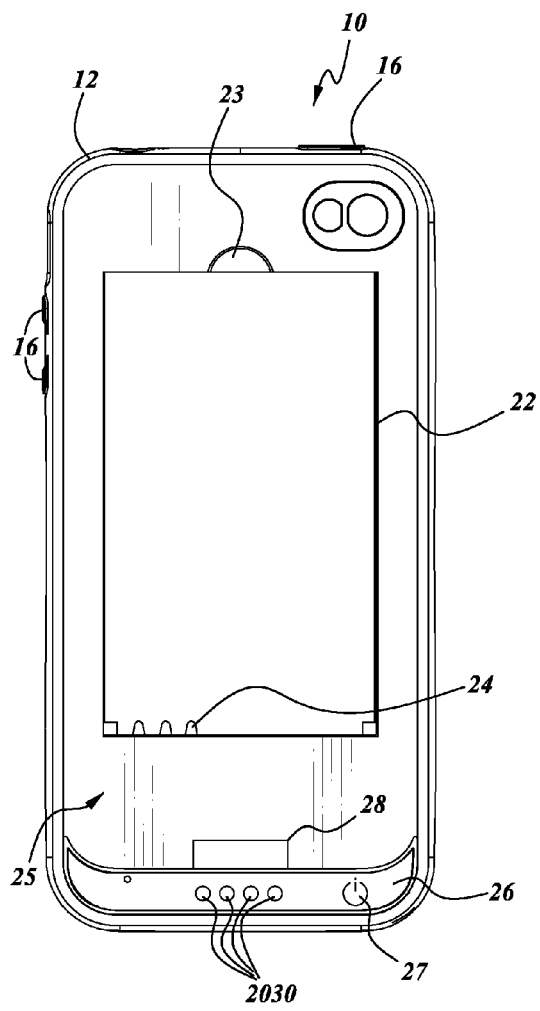
FIG. 2 is a top plan view of the case of FIG. 1.
Figure 3:
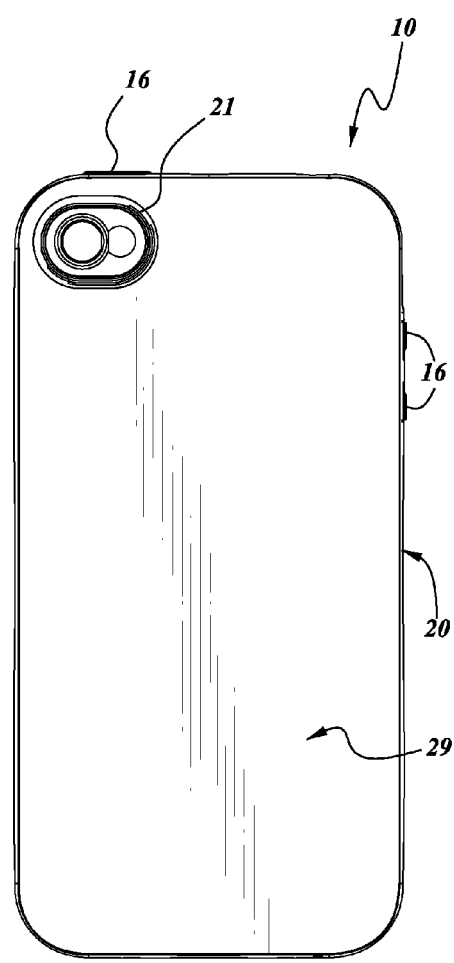
FIG. 3 is a rear plan view of the case of FIG. 1.
Figure 4:
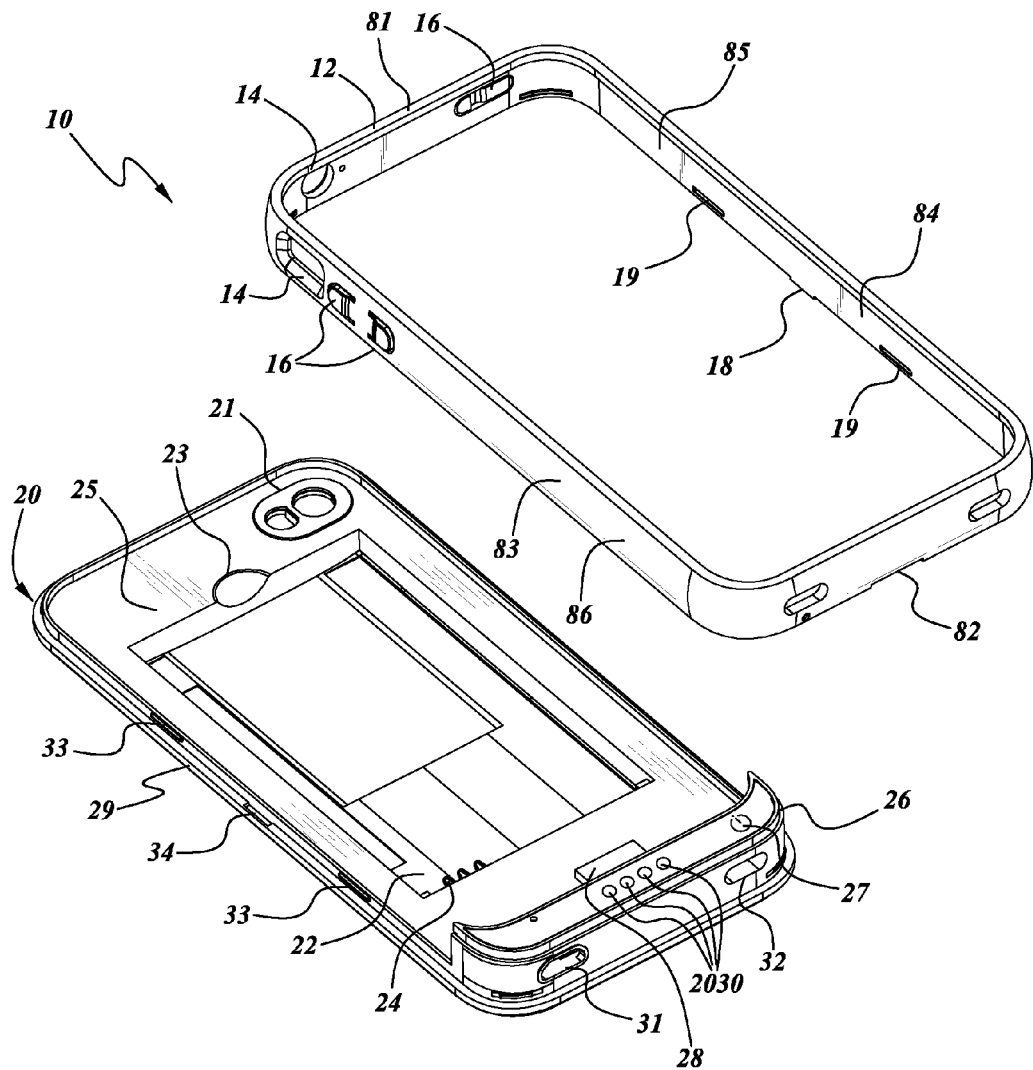
FIG. 4 is a front side perspective exploded view of a battery case according to the case of FIG. 1.
Figure 4A:
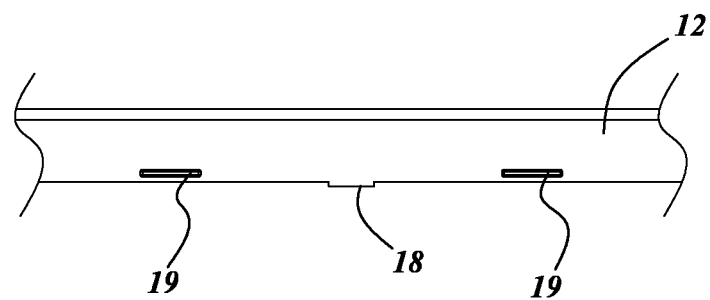
FIG. 4A is a right side plan magnified view of the interior of a bumper portion of the case of FIG. 1.

With reference to FIGS. 1-4, an improved battery case for a mobile device can comprise a case 10. As best seen in FIG. 4, the case 10 generally comprises a base portion 20 and a side protector or bumper portion 12. The case 10 can be generally shaped to contain and protect a mobile device (e.g. an iPhone®). When placed inside of a case, the mobile device (FIGS. 6C and 6D) desirably fits snugly, although the user desirably still has access to the buttons and/or touch screen of the mobile device either directly through apertures in the case 10 or indirectly through button features included on the bumper portion 12 or base portion 20. According to some embodiments, the bumper portion 12 and the base portion 20 are attached together permanently or semi-permanently to comprise a single integral unit. According to other embodiments, the bumper portion 12 and the base portion 20 comprise a case 10 that comprises two pieces that are releasably attached together to contain a mobile device, as illustrated in the embodiment of FIG. 4.

Figure 1:
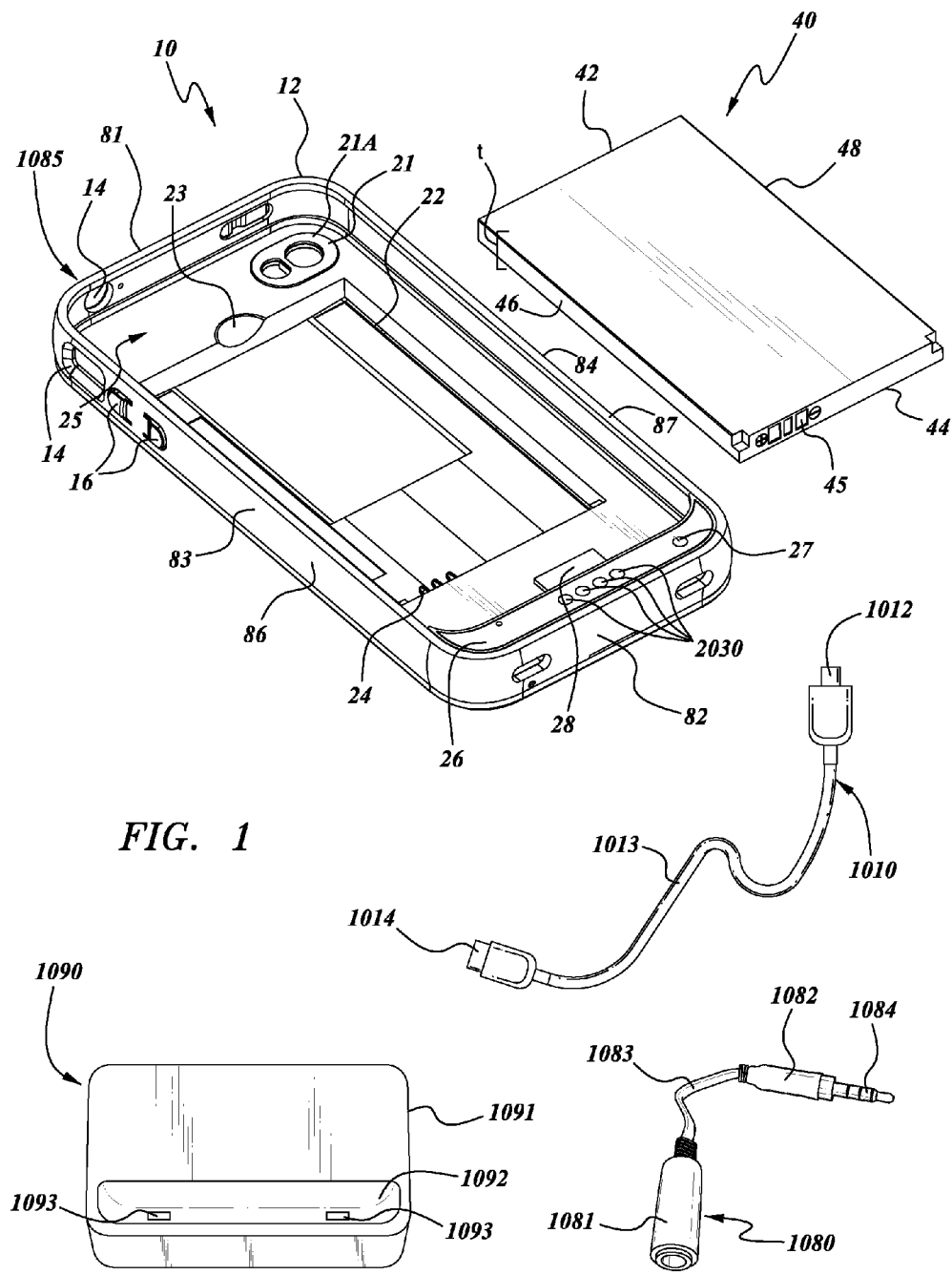
FIG. 1 is a front side perspective view of an assembly, including a battery case and a rechargeable battery according to one embodiment.

As illustrated in FIGS. 1-4, the bumper portion 12 can comprise a single piece, forming a perimeter of the case 10. The bumper portion 12 may comprise a first side or end 81 and a second side or end 82 opposite the first end 81. The bumper portion 12 may also have a third side 83 opposite a fourth side 84. The bumper may also have an inner surface 85 and an outer surface 86. The bumper portion 12 may also have a front edge 87. Desirably, the front edge 87 is flush or substantially flush with the screen or display of a mobile device when the mobile device is within the case. However, in other embodiments, the front edge 87 extends over or overhangs at least a portion of the mobile device screen when a mobile device is inserted in case 10. As is shown in FIGS. 1 and 4, the bumper comprises a single side protector which is configured to protect each of the four sides of a mobile device received within the case 10. Alternatively, however, the case could have one or more separate side protector corresponding to each individual side of the mobile device, or have one or more separate side protectors which wrap around the corner of the mobile device and therefore protect at least a portion of two or more sides of the mobile device.

In some embodiments, the continuous bumper portion 12 may comprise two or more pieces that connect together to form a perimeter of the case 10. The two or more pieces may interlock together to protect the sides of a mobile device. However, in other embodiments, the bumper may comprise two or more pieces that may be integral with two or more pieces of the base portion of the case. In such an embodiment, the two or more pieces of the case each comprising a piece of a bumper portion and a piece of the base portion may connect to one another around a mobile device, via an appropriate mechanism such as a slide-and-lock mechanism.

The bumper portion may include feature apertures 14 corresponding to features on the mobile device, for example, the headphone inlet and the vibrate switch (illustrated). Other feature apertures may be incorporated into the bumper portion 12 to allow for access to the on/off button, speakers, volume controls, Bluetooth® switch, and other such features present on the mobile device. The bumper portion 12 may also include button features 16 corresponding to other features on the mobile device such as volume controls and sleep or on/off switches (illustrated). The button features 16 may also be formed into the bumper portion to correspond to other features of the mobile device. The button features 16 may be raised and/or molded into the bumper portion 12, as thus made of the same material of the bumper portion 12. However, in some embodiments the button features 16 may be made of a different material than the bumper portion 12, or they may comprise an additional material, such as rubber, coated on the button features 16 to improve tactility and use of the button features 16.

The bumper portion 12 may be made of a plastic or polymeric material. In some embodiments, the bumper portion 12 is molded in a single piece, and is made of a suitable material such as polycarbonate, polypropylene, polyvinyl chloride, and the like. The bumper portion 12 may be made by a suitable process such as injection molding. Preferably the bumper portion 12 is made of a material that is suitably flexible to allow a mobile device to fit snugly within the bumper portion 12 and to allow the button features 16 to flex and contact the corresponding buttons on a mobile device without fracture. Additionally, the material may be impact resistant enough to resist fracture when the case 10 containing a mobile device is dropped from a user's hand, a table, a desk and similar heights onto a variety of surfaces including concrete, asphalt, carpet, and the like. Such a height may include heights such as six feet, five feet, four feet, three feet, and the like.

Additionally, the bumper portion 12 may be made of a plastic or polymer material that can be made in a variety of hues. By providing a bumper portion 12 that can be made in a variety of colors, a user can personalize the battery case 10, without having to purchase a new base portion 20, which may include components that are much more expensive and/or difficult to manufacture than bumper portion 12. In some embodiments, the bumper portion 12 may be made of a plastic or polymeric material that is red, blue, orange, yellow, green, purple, pink, white, black, or a mixture of any of the above. The bumper portion 12, in certain embodiments, may also be made of a variety of materials, thus allowing for further personalization of the case 10.

As illustrated in FIGS. 3 and 4, base portion 20 forms the base of the case and is configured to support the mobile device and provide a base to which the bumper portion 12 can attach. The base portion 20 may include a thin substantially rectangular body defining a back panel 29 adapted to form an outer surface of the case 10 and an inside panel 25 adapted to support and be positioned adjacent to a mobile device. The case and, desirably, the inside panel 25 define a plane corresponding to the position of the back surface of the mobile device when it is positioned within the case 10. The base portion 20 may further include a nested portion 26 extending from the inside panel 25 opposite the back panel 29.

In some embodiments, electrical contacts may be present on the base portion of the case 20. The electrical contacts may be located near or on the bottom end of the base portion 20. In other embodiments, the electrical contacts may be located elsewhere along the back panel 29. The electrical contacts may be configured to connect to a charging device.

A data or charging device may comprise any device that may transfer power from a power source to the case 10 and/or charger 50. In some embodiments, the charging device may be a charging and/or data cable such as charging cable 1010.

In other embodiments, the charging device may include a charging cradle 1090 in addition to or instead of a charging cable 1010. A charging cradle may include a base 1091 that may include a concave surface 1092 shaped to fit a case 10. The concave surface 1092 may also assist in holding a case alone or a case containing a mobile device upright. The charging cradle, in some embodiments, may also be able to charge the charger 50. In some embodiments, the base may be relatively planar, and the case may be laid flat upon the base. The charging cradle 1090 may also include one or more leads 1093 that may transmit power to corresponding contacts on the case 10 or charger 50 when the contacts are touching the leads 1093. The base 1091 may also include a plug or port or means to provide power to the base 1091. In some embodiments, the charging cradle 1090 may include a port configured to plug into the case 10 to provide power to charge the case with or without a mobile device contained therein.

A charging cradle 1090 may be configured to charge the case with or without a rechargeable battery contained therein and with or without a mobile device. The charging cradle 1090 may be able to charge any piece of the mobile device assembly inductively or conductively.

The base portion may further comprise a feature opening or window 21, shaped to allow a view of a feature located on the rear of the mobile device, such as a camera lens (illustrated). According to some embodiments, a camera lens insert 21A may be inserted into the feature opening 21. Such insert may protect the case 10 from scratching the surface of a mobile device contained within the case. The base portion also may define a battery aperture 22, shaped to contain a rechargeable battery 40. Electrical components (not illustrated) may also be contained within the base portion 20. The nested portion 26 may extend above the inside panel 25 so as to be flush or substantially flush with the outer edge of the bumper portion 12. In some embodiments, "substantially flush" may mean that the nested portion 26 extends above or below the bumper portion 12, a distance of about 1 mm, 2 mm, 3 mm and the like. The nested portion 26 may comprise a plug 28 and controls 27. The inside panel 25 and bumper portion 12, when the case is assembled, may form an inner portion containing the nested portion 26, inside panel 25 of the base portion 20, and the inner side of the bumper portion 12. The inside panel 25 may be attached to the back panel 29 by a suitable adhesive such as an epoxy or acrylic.

Electrical components, which may be contained within the nested portion 26, may comprise such components as wires, printed circuit boards, capacitors, resistors, and the like. The electrical components may transfer the charge from the battery 40, when placed in the battery aperture 22 to a mobile device connected to the plug 28. The controls 27 may also operate the electrical components. The electrical components may also allow the battery 40 to be charged when placed in the battery aperture 22 in the case 10 when a charging cable 1010 is inserted into the inlet 31 and connected to a power source such as a computer or a power outlet. Additional circuitry allowing accurate exchange of information, e.g., battery condition information, between the battery case 10 and the mobile device are shown in FIG. 14 and discussed below.

The charging and/or data cable 1010 may have a male connector 1012, at one end configured to be inserted into the case 10, another male connector 1014 at the other end shaped to connect to a power source, and a wire 1013 joining the connectors 1012, 1014. The charging and/or data cable 1010 may be capable of transferring power and/or data between a power source and/or computer and a case.

The charging cable 1010 may be any type of cable having any number of wires that can electronically connect the case 10 to a computer or power source. In one embodiment, the cable is a USB cable (e.g., a USB 2.0 cable) where male connector 1012 is a USB mini-A plug and male connector 1014 is a USB type-B plug. The charging cable 1010 may allow rechargeable battery 40, an internal battery of a mobile device, or both to be charged by a computer and/or power source. In some embodiments, when the charging cable 1010 connects the case 10 to a computer, the mobile device and the computer may be synchronized or synched. In such embodiments, the cable 1010 may be configured to transfer data from the mobile device contained within the case to a computer and/or from a computer to the mobile device contained within the case.

The cable 1010, in some embodiments, may be able to charge an internal battery within the case, a rechargeable battery positioned within the case, or a mobile device placed inside of the case. In some embodiments, the charging cable may be able to charge a mobile device within a case, even though no rechargeable battery is present in the case.

Figure 1A:
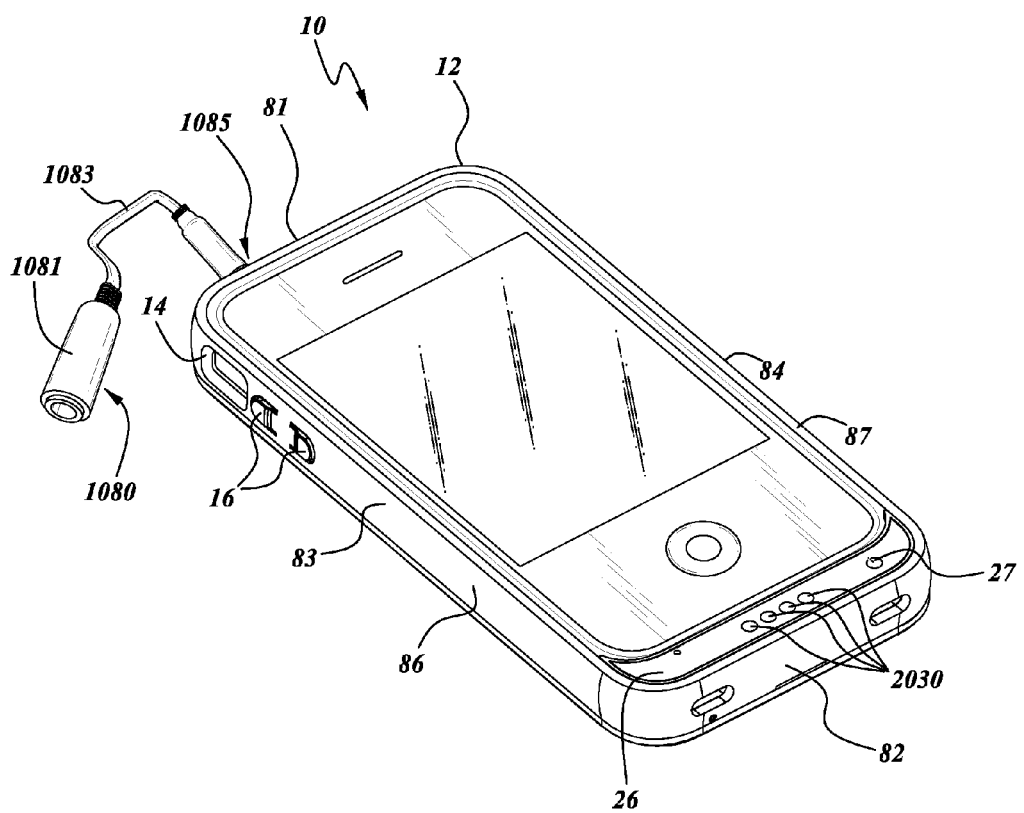
FIG. 1A is a front side perspective view of the case of FIG. 1 containing a mobile device.

In some embodiments, a headphone adapter 1080 may be provided in the kit described above. The headphone adapter 1080 may be generally configured to connect a headphone jack that is too large (e.g., has too large of a circumference) to fit through the opening in the case to properly connect within the headphone inlet of a mobile device, to a headphone jack inlet on a mobile device when the mobile device is within the case 10. The headphone adapter 1080 may have a female end 1081 connected to a male end 1082 by a connecting wire 1083. In use, a user may plug a headphone jack (not pictured) into the female end 1081, and then the user may plug the male end 1082 into the mobile device. The user may plug a distal end 1084 of the male end 1082 through the headphone aperture 1085, and into a device within the case, as illustrated in FIG. 1A. Once connected, the headphone adapter 1080 can transmit sound from the mobile device through the adapter 1080 to the headphones.

In an embodiment, no external wire, such as connecting wire 1083, connects the male and female ends. In such an embodiment, the female end and male end are externally directly connected to one another.

Figure 5:
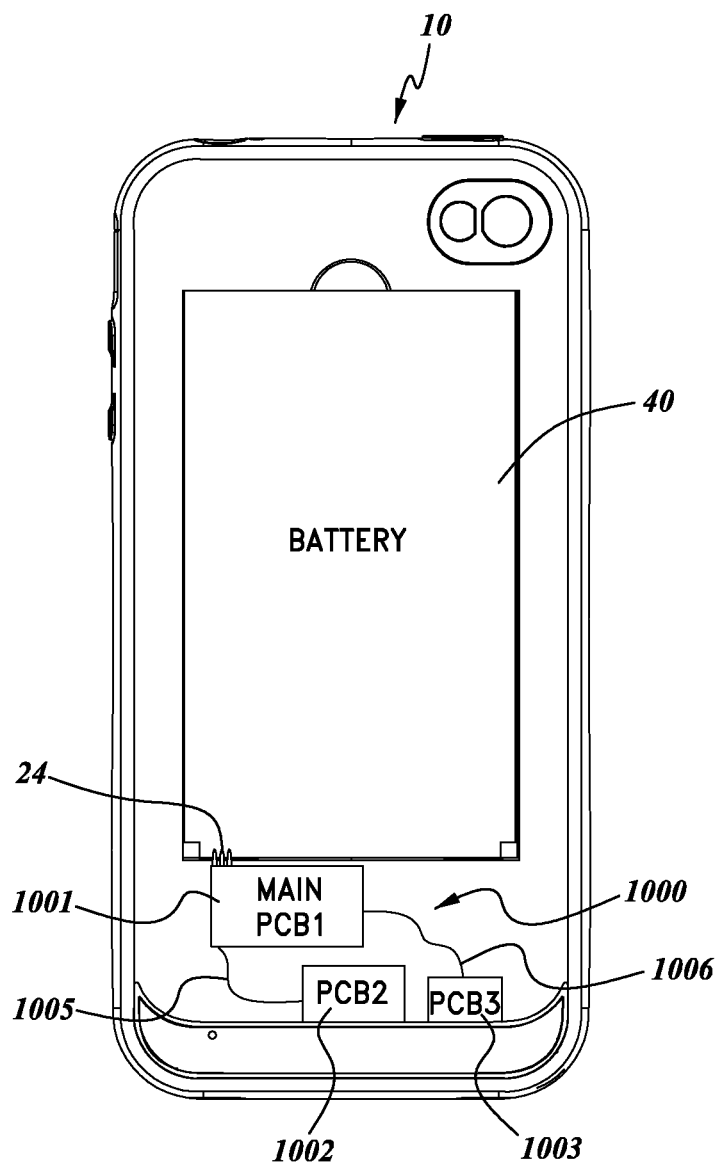
FIG. 5 is a top schematic layout view illustrating the electrical components for the base portion of the case of FIG. 1.

FIG. 5 illustrates a schematic view of the case 10 illustrating the electrical components. As shown in the figure, there are three printed circuit boards (or "PCBs"), the main PCB1 1001, PCB2 1002, and PCB3 1003. PCB1 1001 is the main PCB, which may contain such items as a controller, firmware, an authentication chip, a battery charging circuit, and LEDs, etc. FIG. 14, discussed below, contains a block diagram of a circuit that can be placed on PCB1 to control the battery case. PCB2 may contain a case connector, such as a USB, Apple® 30 pin or Lightening connector. PCB3 1003 may contain the USB connector. Main PCB1 1001 connects to PCB2 1002 through a cable 1005. Main PCB1 1001 also connects to PCB3 1003 through a cable 1006. Main PCB1 may also be electrically connected to the prongs 24 to transfer electrical charge to and from the rechargeable battery 40. In an alternative embodiment, the components of PCB1, PCB2 and PCB3 can be integrated onto a single PCB, or arranged such that the components reside on two PCBs.

As shown in the embodiment of FIG. 1, the battery aperture 22 may be shaped to contain a rechargeable battery 40 and located on the inside panel 25 of the base portion 20. The battery aperture 22 may comprise a detent 23 shaped in a semi hemispherical fashion to allow a user to easily remove a battery 40 from the battery aperture 22. The battery aperture 22 may also comprise conductors, such as leads or prongs 24 to allow a battery 40, when placed in the case, to transfer electrical charge to the electrical components within the base portion 22 (not illustrated). The prongs 24 may also provide additional pressure to the battery 40, when placed in the battery aperture 22, to assist in keeping the battery 40 in place in the base portion 20.

As illustrated in the embodiment of FIG. 1, the battery 40 may be shaped generally rectangular to fit in the battery aperture 22. The battery 40 may have a top end 42, a bottom end 44, a left side 46, and a right side 48. Electrical connectors 45 may be disposed on the bottom end 44 and be located on the bottom end to correspond with the prongs 24 in the battery aperture 22. This may allow for an electrical charge to transmit between the battery 40 and the electrical components. The battery 40 may have a thickness t. The thickness t may be roughly the same as the height of the battery aperture. Hence, when the battery 40 is in place in the battery aperture 22, a mobile device, when placed in the case 10 lies flat. In some embodiments, the thickness t may be slightly less than the height of the battery aperture, hence still allowing the mobile device when placed in the case to lie flat.

Desirably, the thickness t of the battery 40 is in the range of between 2 mm (or about 2 mm) and 12 mm (or about 12 mm) thick. According to other embodiments, the thickness t is in the range of between 3 mm (or about 3 mm) and 10 mm (or about 10 mm), between 3 mm (or about 3 mm) and 7 mm (or about 7 mm), between 6 mm (or about 6 mm) and 9 mm (or about 9 mm), or between 7 mm (or about 7 mm) and 8 mm (or about 8 mm). Desirably, the thickness t of the battery 40 is less than 13 mm (or about 13 mm), less than 10 mm (or about 10 mm), less than 8 mm (or about 8 mm), less than 7 mm (or about 7 mm), less than 6 mm (or about 6 mm), or less than 5 mm (or about 5 mm).

The battery 40 may comprise any suitable (preferably rechargeable) battery. The battery may be able to hold 3.7 V or 1700 mAh of charge, 1600 mAh of charge, and the like. Such batteries may include a lithium ion battery. In other embodiments, the battery may be nickel cadmium, nickel metal hydride, lithium-ion polymer, lithium polymer, lead acid, or any other type of rechargeable battery. In some embodiments, the battery may be disposable. The battery may be advantageously shaped to fit within the battery aperture 22. The battery may comprise one or more batteries, for example two batteries, three batteries, ten batteries, or however many a user may possess.

While the illustrated embodiment in FIGS. 1, 2, and 4 shows the battery aperture 22 located roughly in the center of the inside panel 25 of the base portion 20, in other embodiments the battery aperture may be located on any portion of the inside panel 25 of the base portion 22, e.g. near the top, bottom, left hand side, right hand side, and the like. According to other embodiments, the battery aperture may be located on the back panel 29 of the base portion 20. In such embodiments, the battery aperture may be covered by a door that may be opened by a user by pressure, or by pressing a button located on the base portion 20.

The plug 28 may extend from the nested portion 26 and be adapted to be inserted into the port jack of a mobile device. The plug 28 may be able to communicate electronically with a mobile device and deliver charge to a mobile device from the case 10 containing a battery 40 containing at least a partial charge, and which can power the mobile device and/or charge the battery 40. In some embodiments, the plug 28 may also be configured to send data to and receive data from a mobile device.

The controls 27 of the nested portion 26 may allow a user to turn the battery case on or off and/or check the charge level of the rechargeable battery 40 when inside of the case 10. The charge level may be indicated by lights such as LED lights 2030 located inside and visible on the surface of the nested portion 26. The controls 27 may also comprise a light that illuminates when the case is on and is providing charge to a mobile device or if the charge level is being tested. The light corresponding to the controls 27 may turn off when the case 10 is not being used to provide charge to a mobile device such as when the user presses the control to turn the power off or when the case runs out of battery energy or if there is no battery 40 within the battery aperture 22.

As shown in FIG. 4, the nested portion 26 may also comprise an inlet 31. The inlet 31 may correspond to or receive a charging cable 1010 that may be used to charge the battery 40 when contained in the battery aperture 22 without removing the battery 40 from the case 10. The charging cable may be configured to plug into a power source, for example, a computer or laptop device, a car outlet, a power outlet and the like.

Also as illustrated in FIG. 4, the nested portion may comprise a speaker aperture 32 that may correspond to the speaker of a mobile device. The speaker aperture may allow access to the speaker of the mobile device so that the user may listen to music or audio from a mobile device without the case 10 obstructing the sound. In some embodiments (not illustrated), the base portion 20 may comprise more than one speaker aperture in different locations, corresponding to the speaker location on the mobile device.

In some embodiments, the back panel 29 is made of a lighter plastic or polymeric material than the inside panel 25 that reduces the total weight of the case 10. Additionally, the material may be impact resistant enough to resist fracture when the case 10 containing a mobile device is dropped from a user's hand, a table, a desk and similar heights onto a variety of surfaces including concrete, asphalt, carpet, and the like. Such a height may include heights such as six feet, five feet, four feet, three feet, and the like. The material may also exhibit beneficial properties such as scratch resistance, modulus, and the like.

Figure 4B:
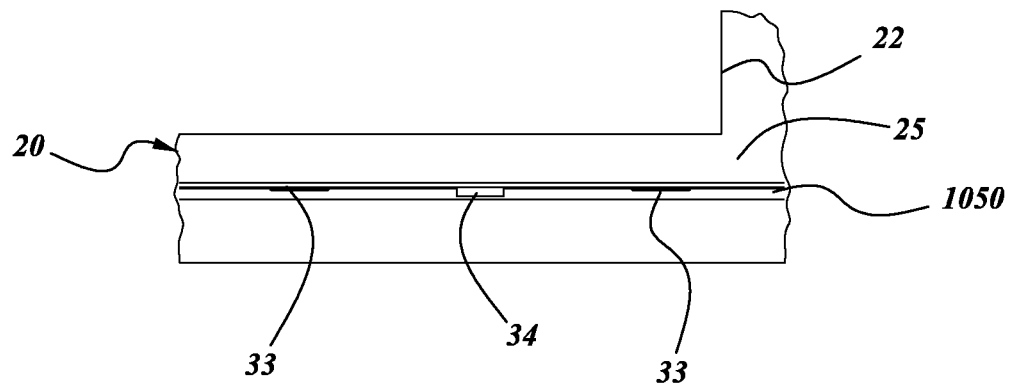
FIG. 4B is a top plan magnified view of a base portion of the case of FIG. 1.
Figure 4C:
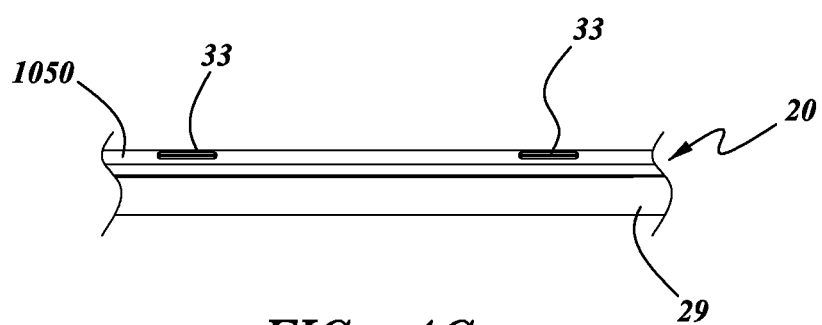
FIG. 4C is a right side plan magnified view of a base portion of the case of FIG. 1.

As illustrated in FIGS. 4B-4C, the inside panel 25 may extend above the back panel 29, forming a peripheral flange 1050. As is illustrated in FIGS. 4 and 4A-4C, the peripheral flange 1050 may include one or more tabs 33 and recesses 34, corresponding to tabs 18 and recesses 19 on the bumper portion 12. The base portion 20 and the bumper portion 12 of the case 10, then may be attached to one another by aligning the bumper portion 12 with the base portion 20 and applying pressure to force the corresponding tabs and recesses on the bumper portion 12 and base portion 20 to interlock with one another and snap into place. To remove the bumper portion 12 from the base portion 20, a user may flex the bumper portion 12 so that one or more of the corresponding recesses and tabs detach from one another, allowing the bumper portion 12 to release from the base portion 20.

In some embodiments only one of the bumper portion 12 or the base portion 20 may comprise tabs or recesses. According to one embodiment, the bumper portion may comprise a single, uniform tab extending inwardly around the perimeter of the inner surface 85, and the base portion comprises a uniform recess extending inwardly around the perimeter of the peripheral flange that receives the uniform tab of the bumper portion.

The bumper portion and the base portion may be designed with a system of tabs and inlets or indents that securely fit the two pieces together in place to prevent separation of the bumper portion from the base portion when the assembled case is dropped from a user's hand, a table, a desk and similar heights onto a variety of surfaces including concrete, asphalt, carpet, and the like. Such a height may include heights such as six feet, five feet, four feet, three feet, and the like. According to some embodiments, this configuration allows the bumper portion and the base portion to stay attached to one another both when a mobile device is contained within the assembled case and when a mobile device is not contained within the assembled case.

Figure 6A:
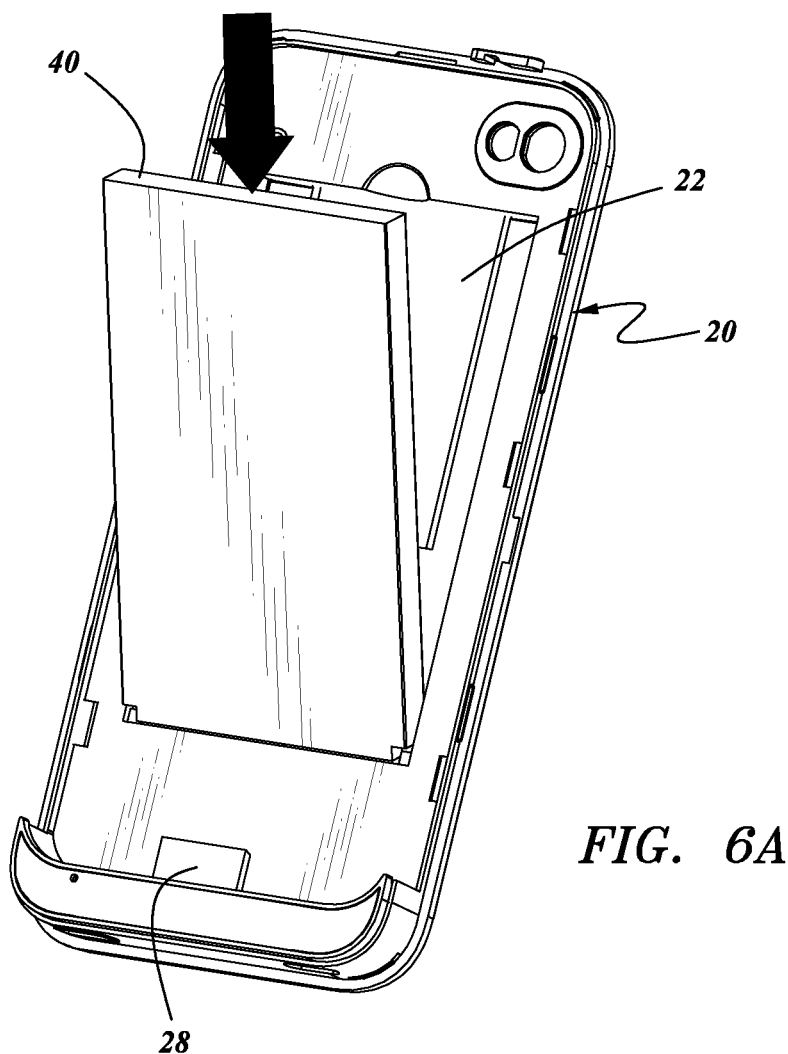
FIG. 6A is a front side perspective view of a base portion of a case according to the case of FIG. 1.
Figure 6B:
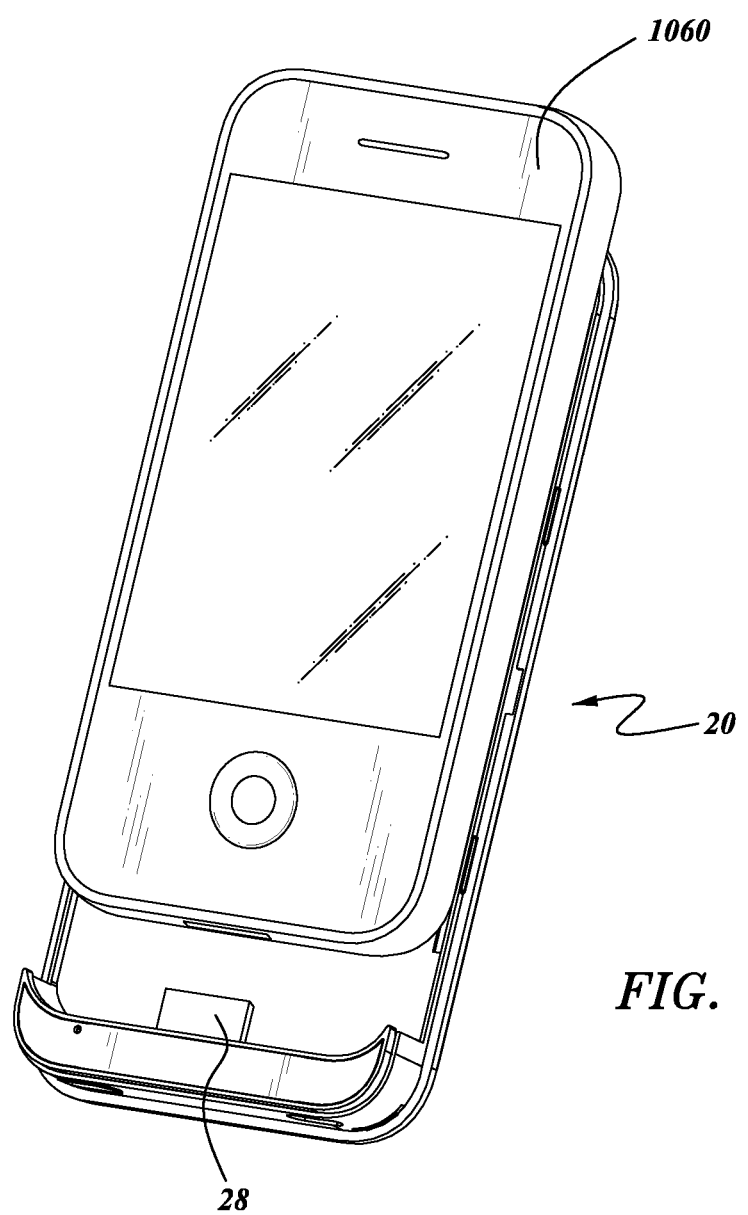
FIG. 6B is a front side perspective view of a mobile device being secured on the base portion of a case according to the case of FIG. 1.
Figure 6C:
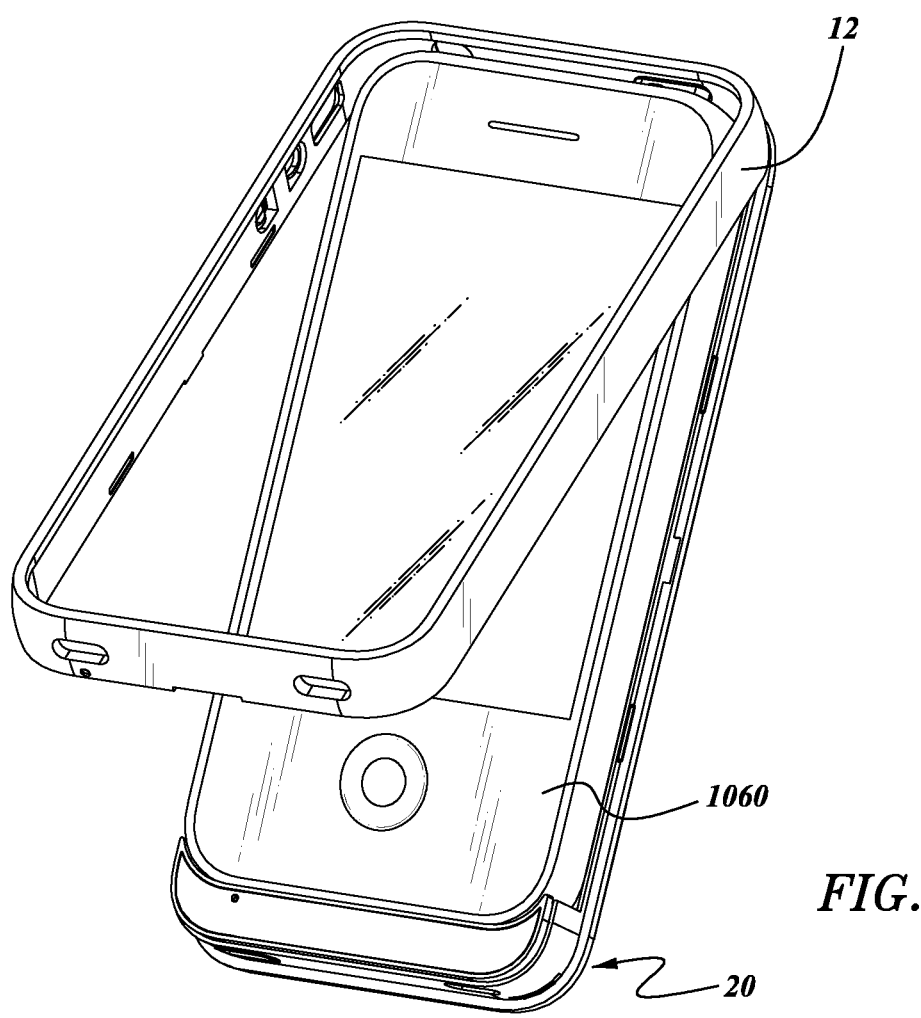
FIG. 6C is a front side perspective view of a mobile device being further secured in a case according to the case of FIG. 1.
Figure 6D:
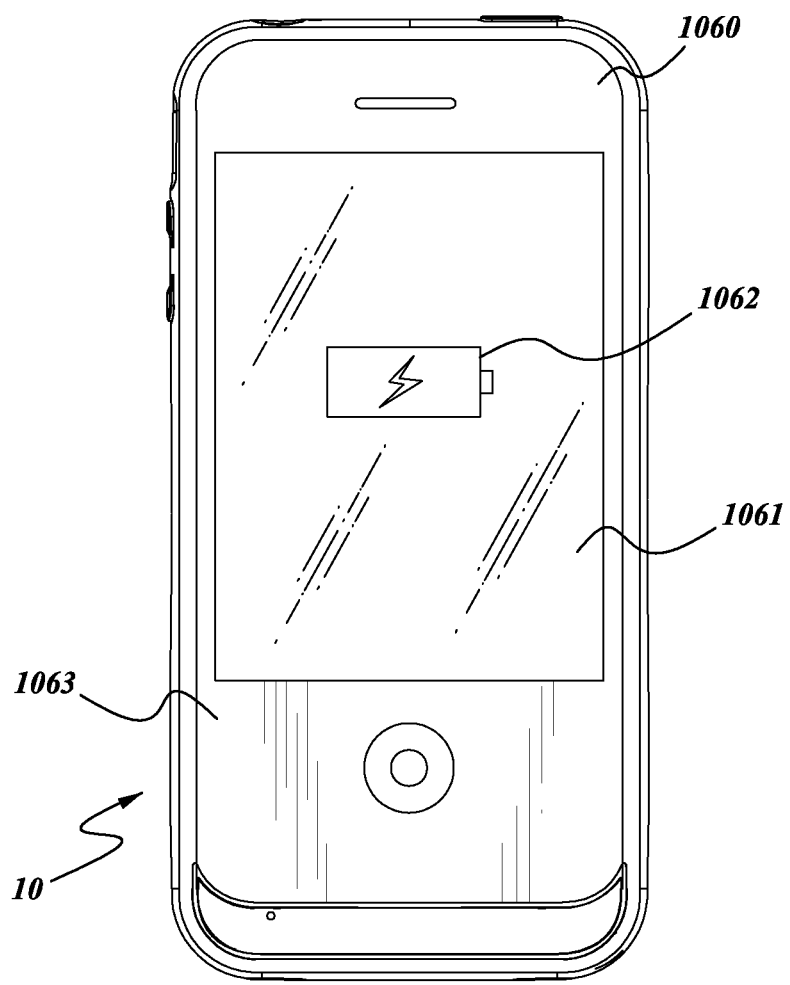
FIG. 6D is a front plan view of a base portion of a mobile device in a case according to the case of FIG. 1.

As illustrated by the embodiment in FIGS. 6A-6D, a user may insert a rechargeable battery and mobile device into the case 10 to provide extra electrical charge to the mobile device to charge an internal battery in a mobile device. As shown in FIG. 6A, first a rechargeable battery 40, holding at least a partial charge, is inserted into the battery aperture 22 in the base portion 20. Then, as shown in FIG. 6B, the user may attach a mobile device 1060 to the base portion 20 by connecting a mobile device 1060 to the plug 28. Then, as shown in FIG. 6C, the user may attach the bumper portion 12 to the base portion 20 by aligning the bumper portion 12 with the base portion 20 and applying pressure to force the corresponding tabs and recesses on the bumper portion 12 and base portion 20 to interlock with one another and snap into place, thus securing a mobile device 1060 within the case 10. As shown by FIG. 6D, when a user turns on the case by depressing the controls 27 (not shown), the mobile device may display an indicator 1062 on its screen 1061 to confirm that an electrical charge is being provided to the mobile device 1060 through the case.

When a mobile device is within the assembled case 10, the bumper portion 12 may extend around the sides of a mobile device. The inner side of the bumper portion 12 may contact a mobile device. The nested portion 26 may contact a bottom edge of a mobile device. The inside panel 25 of the base portion 20 may contact or partially contact a back side of a mobile device. A portion of the bumper portion 12 may extend partially over a front side of a mobile device to help secure a mobile device in the case 10. The front of a mobile device 1060 may comprise the display of a mobile device, a keyboard, a rollerball, a control pad, a touch screen (for example, 1061 in FIG. 6D), and the like.

As illustrated in FIG. 6D, desirably, the bumper portion desirably surrounds each of the sides of the four corners of the mobile device. Desirably, the bumper portion surrounds each of the ends and sides of the mobile device. Desirably, the bumper portion substantially covers each of the sides of the four corners of the mobile device. Desirably, the bumper portion substantially covers each of the ends and sides of the mobile device.

Figure 7:
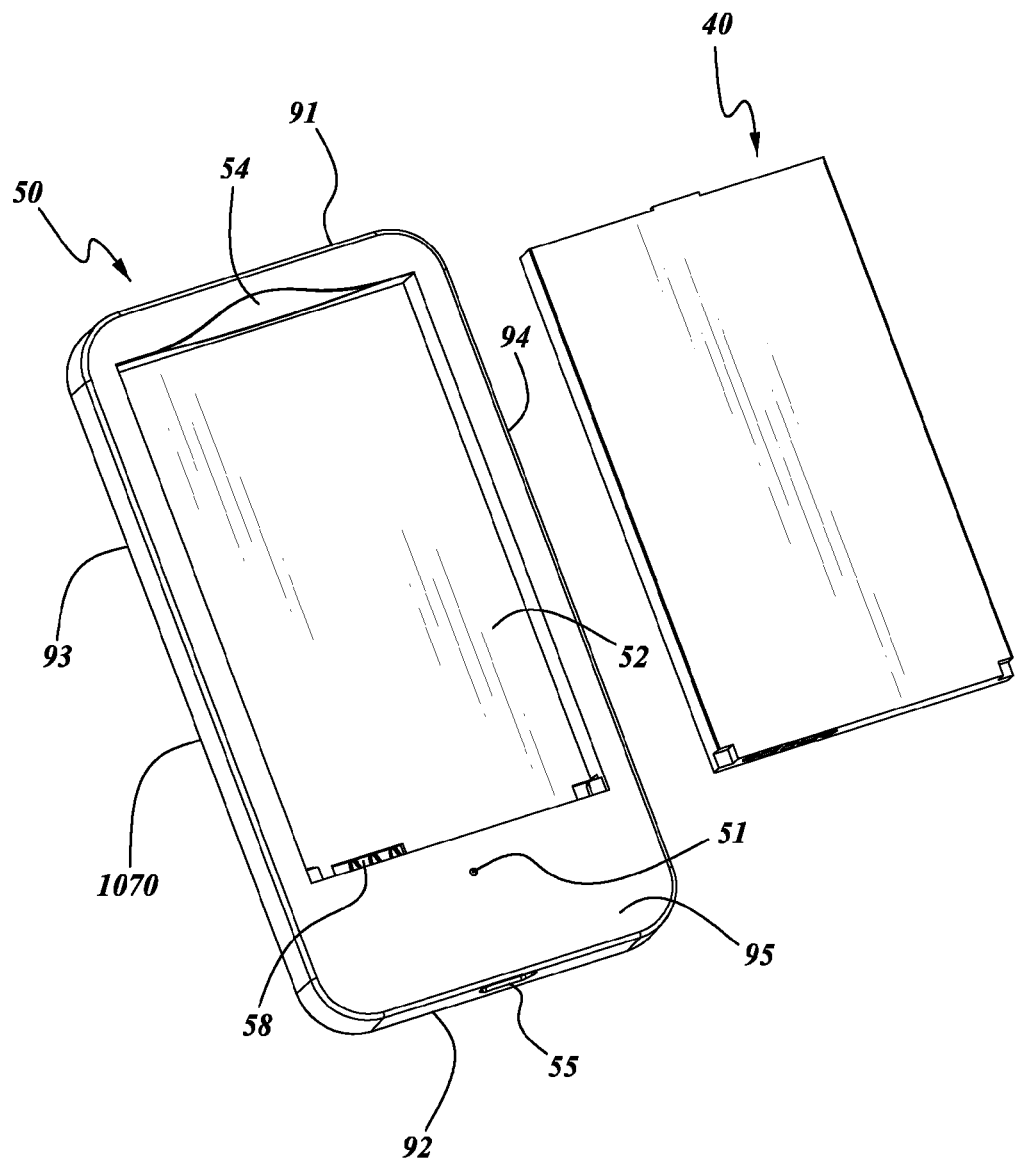
FIG. 7 is a front side perspective view of a charger according to another embodiment.

FIG. 7 illustrates a charger 50 according to an embodiment. The charger 50 may have a top end 91, a bottom end 92, a left side 93, and a right side 94. The charger 50 may also have a front side defining a front face 95 of the charger and a rear side defining a rear face 96 of the case. The charger 50 also comprises a side edge 1070 that defines the side perimeter and thickness of the charger, and connects the front face 95 and the rear face 96. The charger 50 is generally provided to charge a rechargeable battery 40, as described previously.

As is illustrated in FIG. 7, the charger may be shaped in a generally rectangular fashion. However, in other, non-illustrated embodiments, the charger may be generally circular, triangular, or any other suitable geometric shape.

The charger 50 may define a battery aperture 52, shaped to contain a rechargeable battery 40. The battery aperture 52 may comprise a detent 54 shaped in a semi hemispherical fashion to allow a user to easily remove a battery 40 from the battery aperture 52. The charger 50 may also comprise an inlet 55. The inlet 55 may correspond to a charging device (such as cable 1010 in FIG. 1) that may be used to charge the battery 40 when the battery 40 is placed in the battery aperture 52. LED light 51, located on the front face 95 of the case, may become illuminated when the charger is connected to a power source by the charging cable. The charging cable may be configured to plug into a power source, for example, a computer or laptop device, a car outlet, a power outlet and the like. The charging cable may be of the same type disclosed above.

According to some embodiments, the charger 50 comprises a mount instead of an aperture shaped like the battery 40. The mount may comprise metal prongs to transfer power from a charger to the battery attached to the mount. A mount may support the battery in the charger, but without surrounding the battery on all four sides as the embodiment illustrated in FIG. 7.

As illustrated in FIG. 7, the charger 50 may also comprise conductors, such as leads or prongs 58. The prongs 58 may extend from an end wall defining the battery aperture and allow an electrical charge to be transferred to a battery 40 when placed in the charger 50 when a charging cable is connected to the inlet 55 and a power source. The prongs 58 may also provide additional pressure to the battery 40, when placed in the battery aperture 52, to assist in keeping the battery 40 in place in the charger 50. The prongs 58 may also transfer electrical charge from the battery 40 in the charger when the charger 50 is unplugged from a power source.

Figure 8:
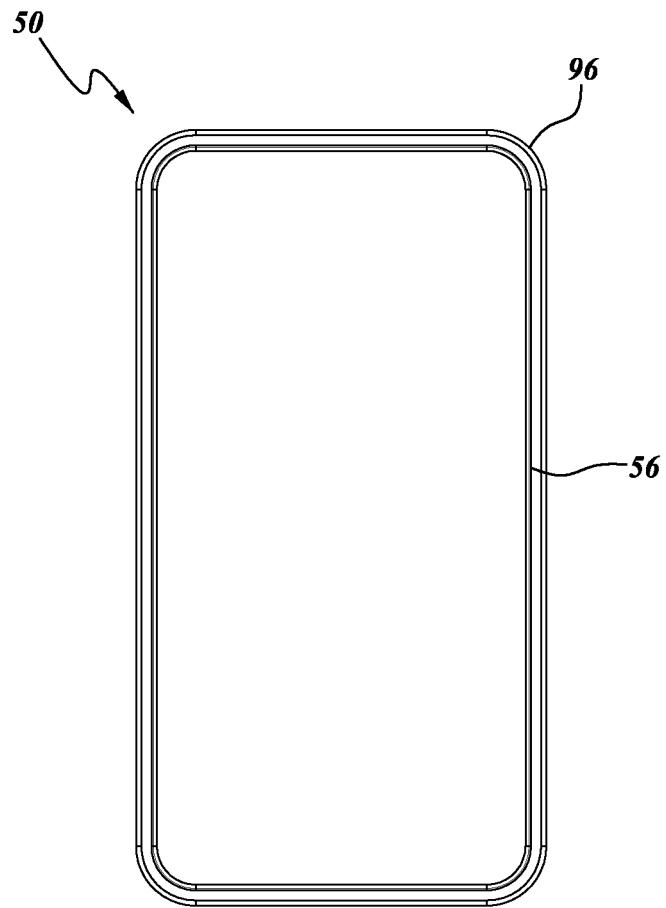
FIG. 8 is a rear plan view of the charger of FIG. 7.

FIG. 8 illustrates another view of an embodiment of the charger 50. According to an embodiment, the back side of the charger 50 may comprise a layer 56 of material. The layer 56 may comprise a polymeric material such as rubber. In some embodiments, the layer 56 may be tacky. The layer 56 may exhibit a coefficient of fraction in the range of 0.75-4.5. The layer 56 may prevent the charger 50 from sliding when subjected to a shearing or linear force when on a hard, flat or relatively surface such as a table, desk, car dashboard, airplane or train tray table, and the like. In some embodiments, the layer 56 may prevent the charger from sliding or otherwise coming displaced when placed inside of the case 10. In other embodiments, the layer 56 may prevent the charger from sliding when placed on top of the inside panel 25 of the base portion 20.

In some embodiments, the charger may comprise an additional port that may be used to transfer power from a battery in the charger, when the battery contains a charge, to another power receiving entity. In some embodiments, the port may comprise an USB port. Thus, in some embodiments containing the additional port, the charger may also transfer power from a battery within the charger containing a charge to charge a laptop, tablet, PDA, e-reader, mp3 player (such as an iPod®), or any other suitable electronic device. According to some embodiments, the charger may also comprise an aperture shaped to form a negative impression of a data port.

According to an embodiment, a charger 50 may be able to discharge power from a rechargeable battery contained within, to the case 10 when a port on the charger is inserted into the inlet 31.

In an embodiment, the charger may have an insert configured to receive either a micro-USB end or a USB end or any end of a charging cable. In such an embodiment, one charging cable may be used to connect the charger to a power source, and a different charging cable inserted in the insert may be connected to the inlet of a case. This configuration may allow for a rechargeable battery contained within the charger, the case, and/or a mobile device contained within the case, and/or a rechargeable battery contained within the case to all be charged at the same time. In such an embodiment, the power source charges the charger, which in turn charges the case, which in turn charges a rechargeable battery contained within the case and/or a mobile device contained within the case.

Figure 9:
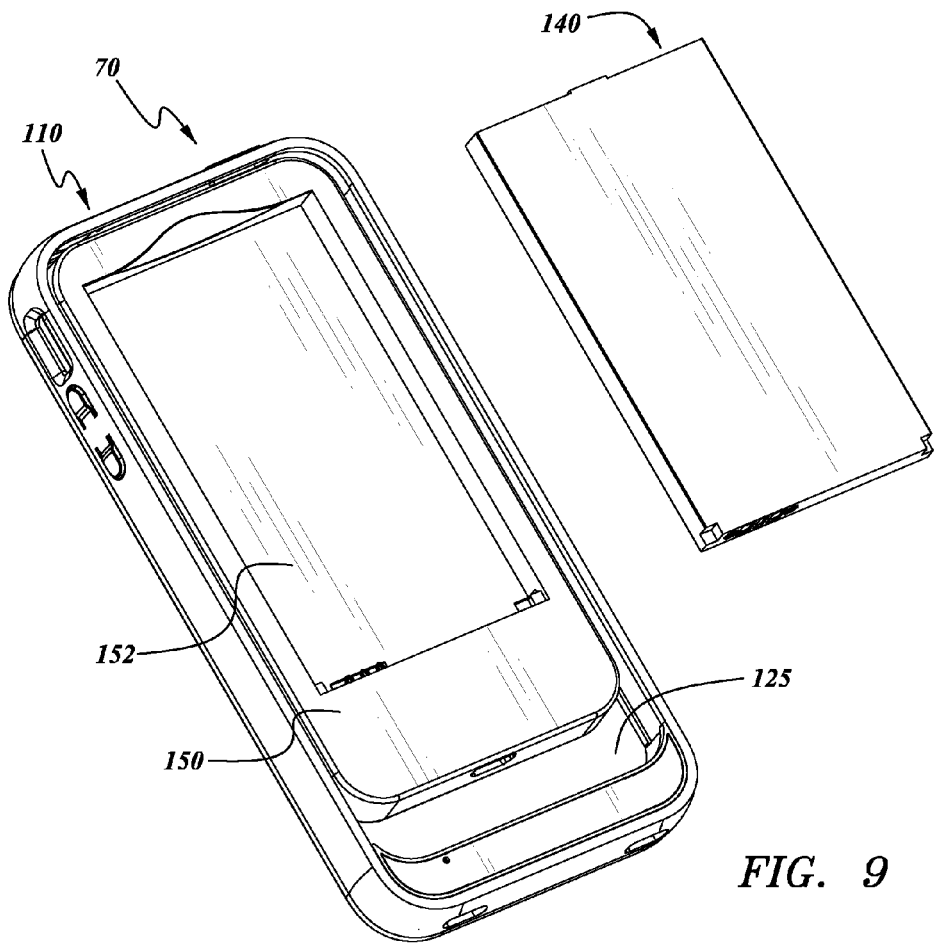
FIG. 9 is a front side perspective view of a kit according to yet another embodiment.
Figure 10:
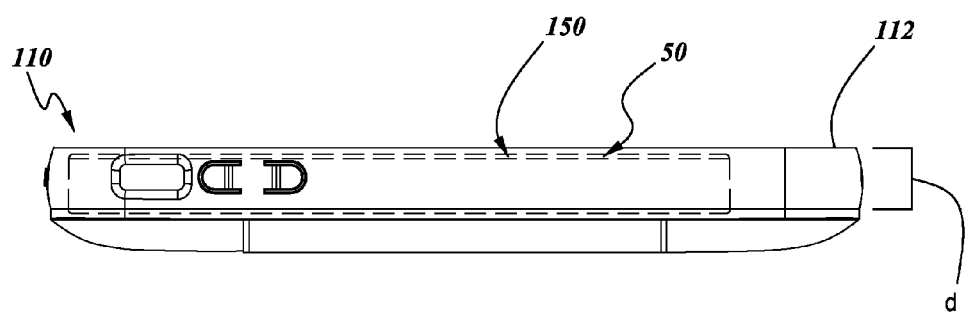
FIG. 10 is a left side plan view of the kit of FIG. 9.

FIG. 9 illustrates an embodiment of a kit 70 comprising a case 110, a charger 150, and at least one rechargeable battery 140. According to some embodiments, the case 110, charger 150, and/or at least one rechargeable battery 140 encompass the features discussed in the embodiments of cases, chargers, and rechargeable batteries discussed above. As is shown in FIG. 9, the charger 150 fits within the perimeter of the case 110. The charger 150 may contact the inner surface 125 of the case 110. When placed inside the case 110, the charger 150 is contained within the case by the bumper portion 112. The bumper portion may define at least one sidewall which extends transverse to the plane which corresponds to the rear surface of the mobile device when the mobile device is received by the case. For ease of reference, it is assumed that the inside panel 25 and the plane are positioned horizontally and, accordingly, the sidewall extends transversely or, preferably vertically. As is illustrated in FIG. 10, which illustrates the charger 150 within the case 110, the charger 150 is flush or substantially flush with the top edge of the bumper portion 112. The bumper portion 112 has a depth d. The depth of the charger 150 may be equal to or less than d.

In some embodiments, as illustrated in the embodiments of FIGS. 9 and 10, when the charger 150 is positioned inside of the case 110, the charger 150 does not extend above at least one, and preferably above any vertically extending side of the case. This may mean that the charger 150 is flush with the bumper portion 112, or that, when placed against the inner surface 125 of the case 120, the charger 150 does not extend as high vertically as the bumper portion.

In some embodiments, a battery 140 may also be stored in the battery aperture 152 of the charger 150 when it is placed in the case 110. According to other embodiments, a rechargeable battery 140 may be placed in a battery aperture of the case 110 (not illustrated) when the charger 150 is placed in the case. According to yet other embodiments, a rechargeable battery may be placed in the battery aperture 152 of the charger 150 and a different rechargeable battery may be placed in the battery aperture of the case 110. Thus a kit according to an embodiment may be able to store up to at least two rechargeable batteries and the charger in the space of the case 110 itself.

The charger's compact design and ability to fit within the case allows for the kit described in aforementioned embodiments to travel easily. The compact kit may be able to fit into backpacks, luggage, purses, pockets, and the like for easy travel. Also, the ability for the pieces of the kit to fit within one another lessens the likelihood that the pieces of the kit will become separated from one another in a large bag or purse. According to some embodiments, the charger has a polymeric coating on the back of the charger that prevents the charger from slipping when placed in the case. This coating, in some embodiments, may also help adhere the charger to the case when a user is traveling, so that the components of the kit are more likely to stay together.

The kit, according to some embodiments, also has the ability to provide a continuous stream of power to a mobile device over an extended period of time. According to one method, a user may charge a rechargeable battery using the charger while a mobile device is inserted into the case where an already-charged rechargeable battery has already been inserted into the case. The user may use the controls to transfer power to the mobile device when needed (e.g., when the mobile device runs out of its own internal battery). Once the rechargeable battery inside the case has drained, a user may remove the mobile device, remove the drained battery, replace the drained battery in the battery aperture of the case with the rechargeable battery containing at least a partial charge, replace the mobile device in the case, then use the controls when necessary to provide additional charge to the mobile device. The drained battery may be inserted into the charger, which may be then connected to a power source to restore charge to the rechargeable battery. In some embodiments, several pre-charged rechargeable batteries may be carried by the user, so that a recharging step is unnecessary.

By cycling draining and charging rechargeable batteries within the case and charger, respectively, a user can keep their mobile device on and/or functioning for extending periods of time without having to plug either the phone or the case into a power source. This is beneficial for circumstances where a user may have limited or no access to a power supply, e.g. on a long flight or train ride, at an airport or train station, on a long car ride, when travelling in the wilderness, and the like.

Figure 11:
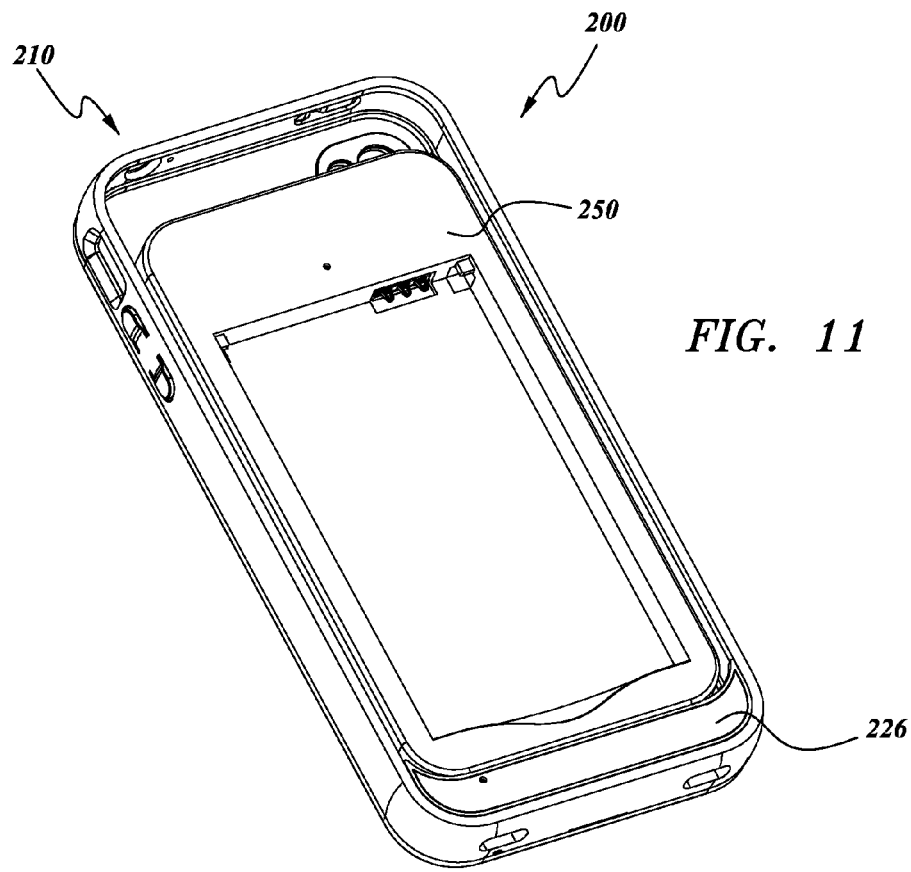
FIG. 11 is a front side perspective view of a system according to yet another embodiment.

As shown in the embodiment illustrated in FIG. 11, a system 200 may comprise a case 210 and a charger 250 configured to attach to the interior of the case 210. The system may also include one or more rechargeable batteries 240. According to some embodiments, the case 210, charger 250, and/or at least one rechargeable battery 240 encompass the features discussed in the embodiments of cases, chargers, and rechargeable batteries discussed in embodiments above. The embodiment of FIG. 11 shows the charger 250 attached to the case 210. The charger 250 may have a recess defining a negative relief image of a protrusion in the case 210. In some embodiments, the recess may be shaped to receive a data port protrusion. In other embodiments, the recess may be shaped to receive a protrusion that has been pre-formed into the base portion 210 or the bumper portion 212 of the case.

Figure 12:
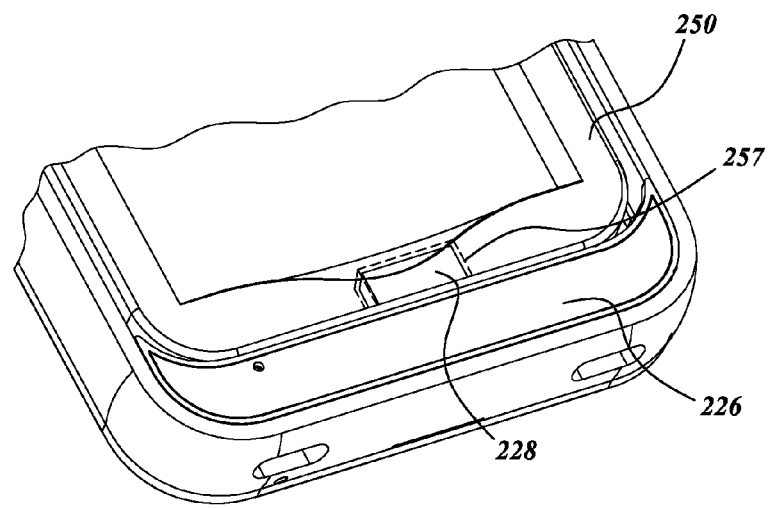
FIG. 12 is a front side perspective magnified cutaway view of a bottom portion of the system of FIG. 11.

FIG. 12 illustrates a magnified view of the bottom portion of the embodiment of FIG. 11, with a cutaway view of the port 228 inside of the charger recess 257. In this embodiment, the charger 250 is securely connected to the nested portion 226 of the base portion 220 of the case 210 via the port 228. When connected, the charger 250 desirably should not separate from the case 210 due to common forces that an object may experience when in a purse, backpack, luggage and the like. This can ensure that the pieces of the system 200 do not come separated from one another in travel and are thus easy for a user to find as well as compact.

According to some embodiments, the charger further comprises a mechanism such as a latch in the recess to further guarantee that the charger will not come separated from the case when they are connected to one another during travel. In some embodiments, the charger comprises a button connected to the latch that the user can press to release the latch and the charger from the case after the charger has been connected to the case.

Figure 13:
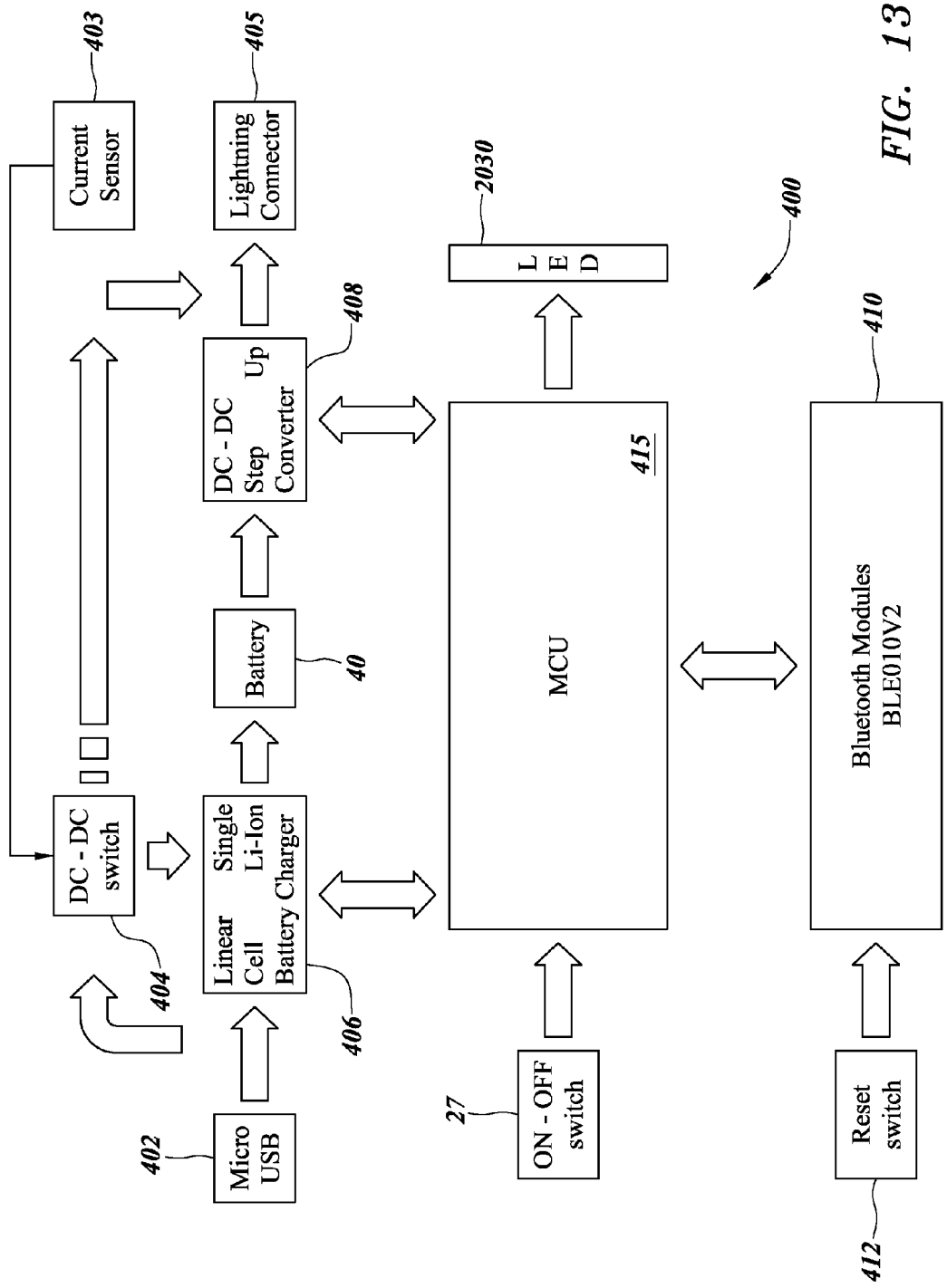
FIG. 13 is a block diagram illustrating circuitry of the auxiliary power supply contained within the protective case.
Figures 15A, 15B:
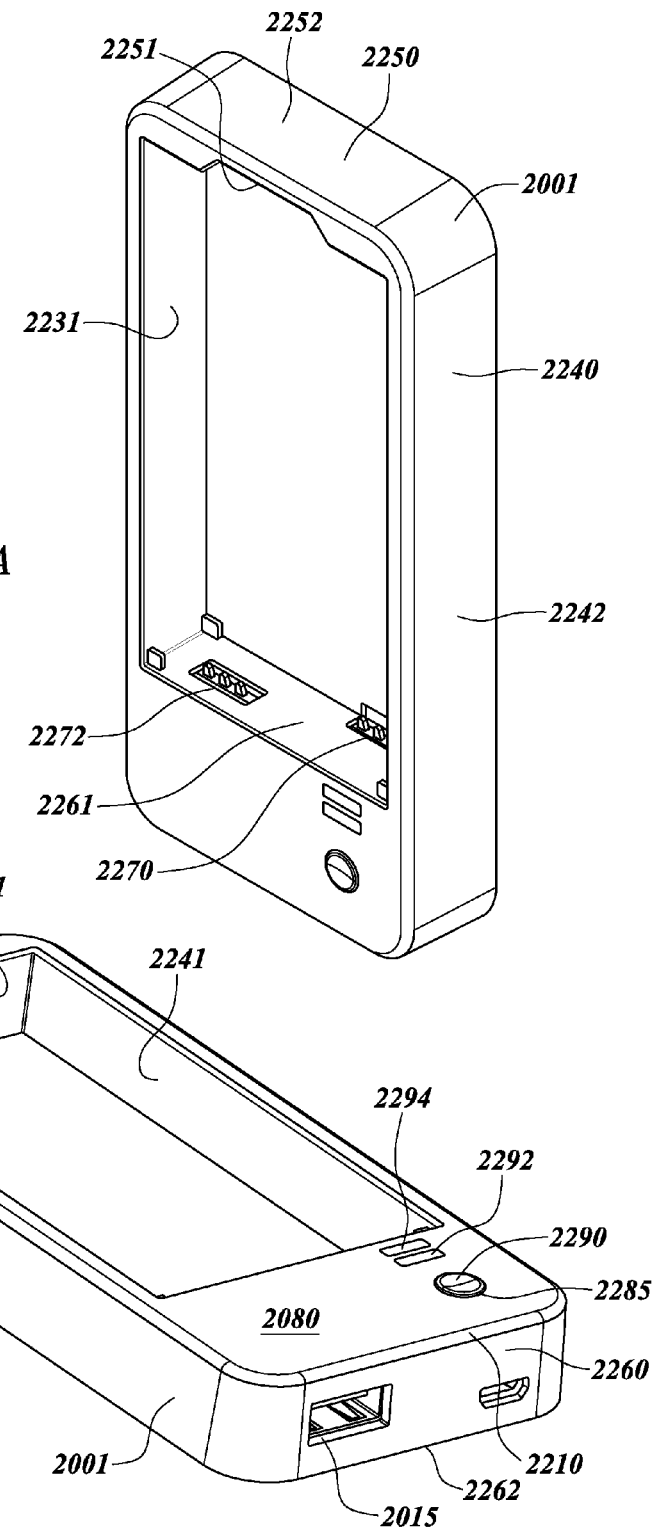
FIGS. 15A-15B are various perspective views of a battery charger as in FIGS. 14A-14F.
Figure 16A:
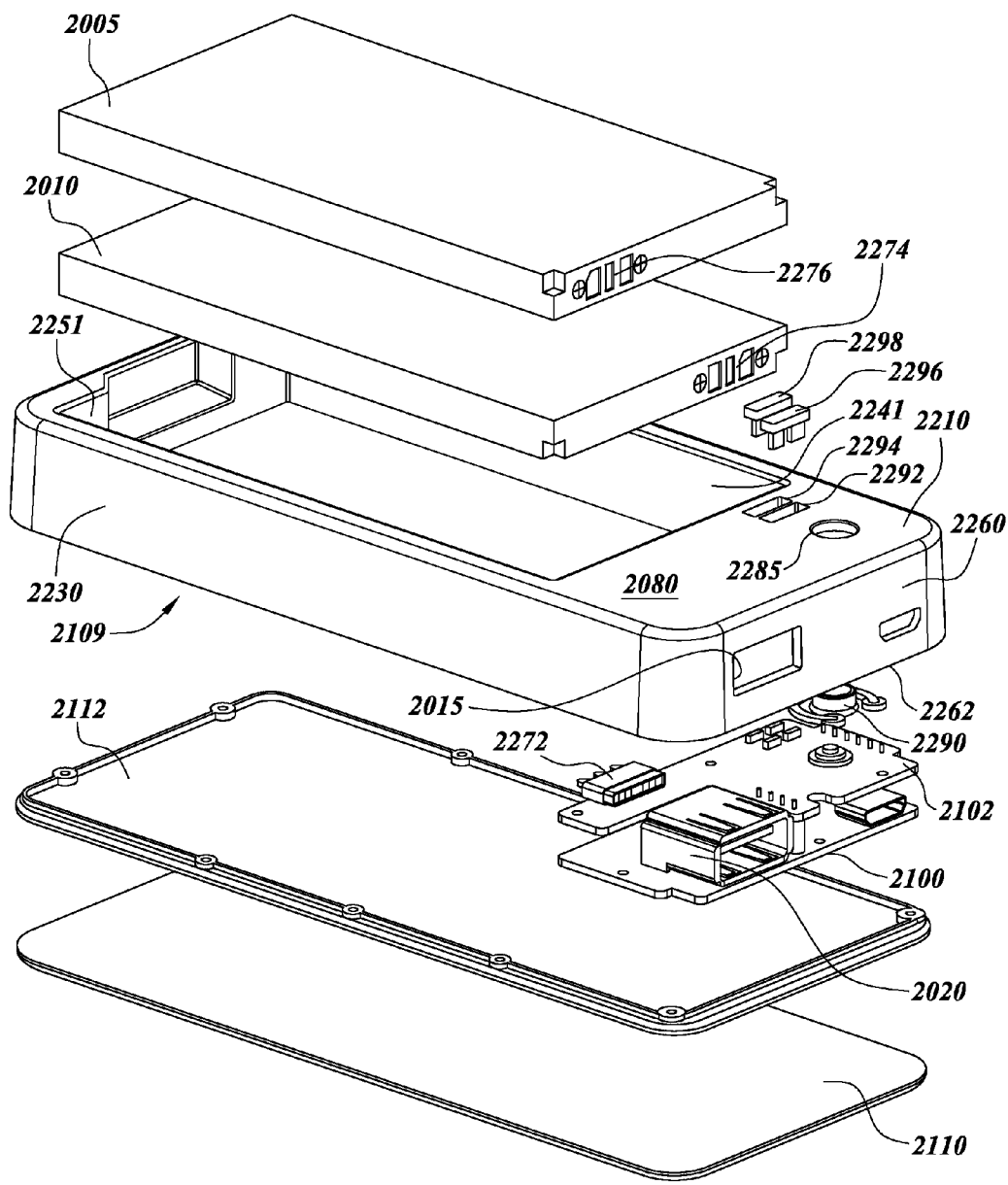
FIGS. 16A-16B are exploded views of various components of a battery charger as in FIGS. 14A-14F.
Figure 16B:
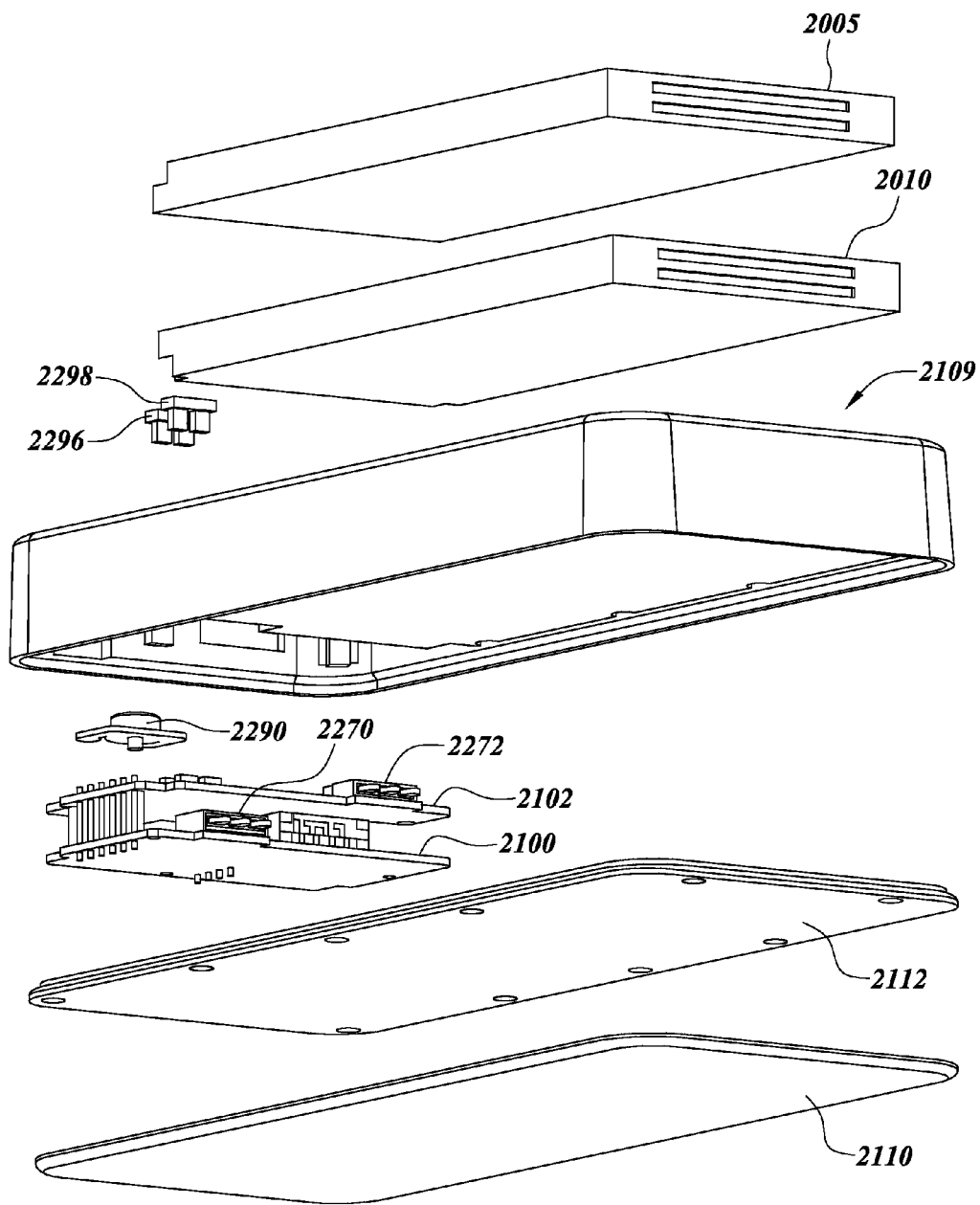

FIG. 13 is a block diagram of control circuitry 400 that can reside in the battery case 10. In one embodiment, the circuitry 400 depicted in FIG. 13 can be placed on PCB1, or if desired, can be placed on either multiple printed circuit boards or a single printed circuit board. Circuitry 400 comprises auxiliary battery 40 that can be charged and discharged using circuitry 400. Electric current is supplied to circuitry 400 of battery case 10 through a port 402 located in-line with inlet 31. In one embodiment, port 402 can be a micro-USB port capable of receiving charging cable 1010 that passes through inlet 31 and is inserted into the micro-USB port. USB, which stands for universal serial bus, is a standard that allows for the supply of electrical current and data signals to peripherals such as mobile devices.

Electrical current that is received on the power supply rails of port 402 is supplied to a DC-DC switch 404 and a battery charging device 406. When the battery case 10 has a charging cable 1010 inserted into port 402 and the mobile device is in an active state, i.e., powered up, a current sensor 403 determines the amount of current being drawn by the mobile device. When the mobile device is drawing a relatively large amount of current (over approximately 800 mA in the case of an iPhone®), the current sensor 403 sends an indication to DC-DC switch 404 that the mobile device is in need of a charge. In such a high-current draw situation, DC-DC switch 404 will direct most of the current received through port 404 to the appropriate pins on the connector 405 that is inserted into the mobile device. In the embodiment illustrated in FIG. 13, connector 405 that is inserted into the mobile device is a Lightning® connector used in Apple® iPhone® mobile devices, but other types of connectors are contemplated and should be selected by determining which type of charging and data connector is used by the mobile device that will be used with the battery case 10. (Lightning is a trademark of Apple Inc.)

Should the current sensor 403 determine that the mobile device is drawing a relatively low amount of electrical current, DC-DC switch significantly reduces the amount of current being input to the mobile device and instead directs the current to battery charging device 406. In one embodiment, battery charging device 406 can be a linear single-cell lithium ion battery charger integrated circuit. Battery charging device 406 in turn supplies electrical current to the battery 40, resulting in charging of battery 40. Thus, when battery case 10 is connected to source of electric current through charging cable 1010, current is always supplied to the connected mobile device, and when the mobile device is drawing a reduced amount of current, indicative of a charged battery, battery 40 of battery case is then charged. Control circuitry 400 also comprises a microcontroller 415, which controls battery charging device 406.

When charging cable 1010 is removed, the mobile device will draw current from its internal battery. As the mobile device draws this current, its internal battery will lose its charge, and eventually become exhausted. In addition to protecting the mobile device from impacts and the like, battery case 10 provides an advantage of being able to supply electric current to the mobile device when internal battery of the mobile device becomes exhausted, or close to exhausted. A problem with prior battery cases is that there was not a reliable manner in which to communicate battery conditions from the mobile device to the battery case such that the battery case would start charging the internal battery of the mobile device. Certain battery cases relied solely on user intervention, i.e., when a user determined that the internal battery of the mobile device was exhausted, such user could enable a switch on the case that would manually enable supply of current from the battery of the battery case to the mobile device. This is not an optimal solution.

Another means of providing mobile device battery condition information to the battery case could be by sending battery condition data from the mobile device, through its charge and sync port, to the battery case. This solution is also not effective because battery condition data sent through charge and sync ports on mobile devices is not reliable, and regardless, required processing devices of the battery case to interpret such data. Inaccurate information is problematic since the battery case might not select a proper time to start current supply. Moreover, for various reasons, including cost, it is desirable to use simple microcontrollers with limited processing abilities. Use of a processing device internally to the battery case that is low cost might be unable to perform the calculations to determine when to start supplying current to the mobile device. Because of this, the presently described battery case utilizes a wireless solution that transmits information indicating when to start supplying current to the mobile device through radiofrequency signals that can be exchanged between the mobile device and the battery case.

In a presently preferred embodiment, communication of battery condition information is transmitted by the mobile device to control circuitry 400 using radiofrequency signals conforming to the Bluetooth Low Energy standard. Thus, control circuitry 400 of battery case 10 comprises a Bluetooth module 410. Bluetooth-enabled devices such as mobile devices are capable of being paired with peripherals that conform to the Bluetooth standard. The resulting link between paired devices is often referred to a peer-to-peer network. Thus, the wireless link formed between Bluetooth module 410 of battery case 10 and the mobile device inserted into battery case 10 is a peer-to-peer network.

Many mobile devices allow installation of software applications, sometimes referred to as "apps," that can run on a mobile device. The battery case 10 described herein can be used with a mobile device running a software application that is able to obtain accurate information regarding the condition of the internal battery of the mobile device, e.g., the level of charge remaining in the internal battery, by interfacing with one or more application programming interface(s) ("API(s)") of the mobile device's operating system.

Moreover, the software application can interface with the Bluetooth module of the mobile device through appropriate APIs to transmit such battery condition information from the mobile device to the control circuitry 400 of battery case 10.

Referring to FIG. 13, Bluetooth module 410, which includes any necessary antenna, radiofrequency devices, control circuitry, and input/output resources, has connected thereto a reset switch 412. Reset switch 412 can be used for at least two functions. The first purpose of reset switch 412 is to allow a user to "pair" the mobile device to be used and the battery case 10. The manner in which Bluetooth devices are paired is known and will not be discussed further. Reset switch 412 can also be used to restart Bluetooth module 410 should there be a system crash or other issue that renders the battery case non-responsive.

Bluetooth module is in electrical communication with a microcontroller 415. When microcontroller 415 is active, no current is being supplied to battery case 10 via charging cable 1010. Microcontroller 415 controls the various circuitry of control circuitry 400 as follows. Software application running on the mobile device preferably operates as a background process. While running, the software application obtains information regarding the condition of the battery internal to the mobile device that is available, e.g., through APIs in the operating system. Such information typically is comprised of the amount of charge remaining on the mobile device's internal battery, although other information can also be collected as well. When the level of charge stored in the battery of the mobile device falls below a certain predetermined threshold, the software application may determine that the battery of the mobile device needs to be charged. When the software application makes this determination, it causes the Bluetooth module of the mobile device to send appropriate signals, over the Bluetooth piconet, to the Bluetooth module 410 of the battery case 10. These instructions are typically communicated from the software application via Bluetooth APIs of the operating system of the mobile device. Bluetooth module 410 communicates this information to microcontroller 415.

Microcontroller 415 is active when battery case 10 is turned on by a user via controls 27 and battery case is not connected to a source of electrical current, i.e., when battery case 10 is not connected to a charging cable 1010. When this set of conditions is met, microcontroller 415 is powered by battery 40, and microcontroller 415 monitors Bluetooth module 410 for receipt of any indication that the internal battery of the mobile device needs to be charged. When Bluetooth module 410 receives appropriate battery condition information, e.g., an indication that the internal battery of the mobile device needs to be charged, such information is received by microcontroller 415. Microcontroller 415 then sends appropriate signals to a DC-DC converter 408 to begin supply of current from battery 40 to the appropriate pins on the connector 405. Should the supply voltage of the battery be lower than the charging voltage of the mobile device, DC-DC converter 408 can be a step up converter, which will increase the output voltage of battery case 10 to the appropriate voltage.

The software application, or "app," running on the mobile device can operate as follows. The app to the protective case via Bluetooth Low Energy and acts as an automatic trigger for the case, turning on the backup battery to begin recharging the phone. The app also acts as a battery monitor for the mobile device inserted into the protective case, measuring the current battery life, and estimating remaining time to perform many common tasks (browsing web using Wi-Fi, talk time, gaming, etc.). The app tracks usage over time with a user login, graph view, and history kept in a digital calendar. Users can store their daily battery usage and develop a trend which, when working in tandem with cloud storage servers, can help cater a battery experience best for each user, depending on how they use their phone. Moreover, the cloud storage servers can send push notifications to users encouraging them to purchase a new case when their battery life cycle has hit its end.

Upon starting the app, a splash screen can be displayed on the screen of the mobile device. The logic of the app is as follows:

Establishing the Connection:
Check for BLE connection availability:
On app load the following methods are called in parallel:
method to check the "Bluetooth Central Manager" status.
If the peripheral connection is lost "Bluetooth Central Manager" calls method to retrieve the peripheral connection.
Scan for peripherals:
If the "Bluetooth Central Manager" is "powered on" the central manager calls method to scan for available peripherals.
Select devices from list:
"Bluetooth Central Manager" calls if peripherals are detected and lists the available peripherals.
Connection is established with a peripheral name using method.
Peripheral service discovery and connection:
Once the connection is established with the peripheral, peripheral starts discovering services
Once the service is detected the peripheral starts discovering characteristic for the identified service.
Write Command:
Write:
Once the peripheral identifies a characteristic, a timer calls a method checks if the device battery percentage is less than a predetermined percentage and if the device is not in the "Charging" status, the peripheral sends command to turn on the case.
The peripheral uses to turn on port1, port2 and find me key.

Figure 18A:
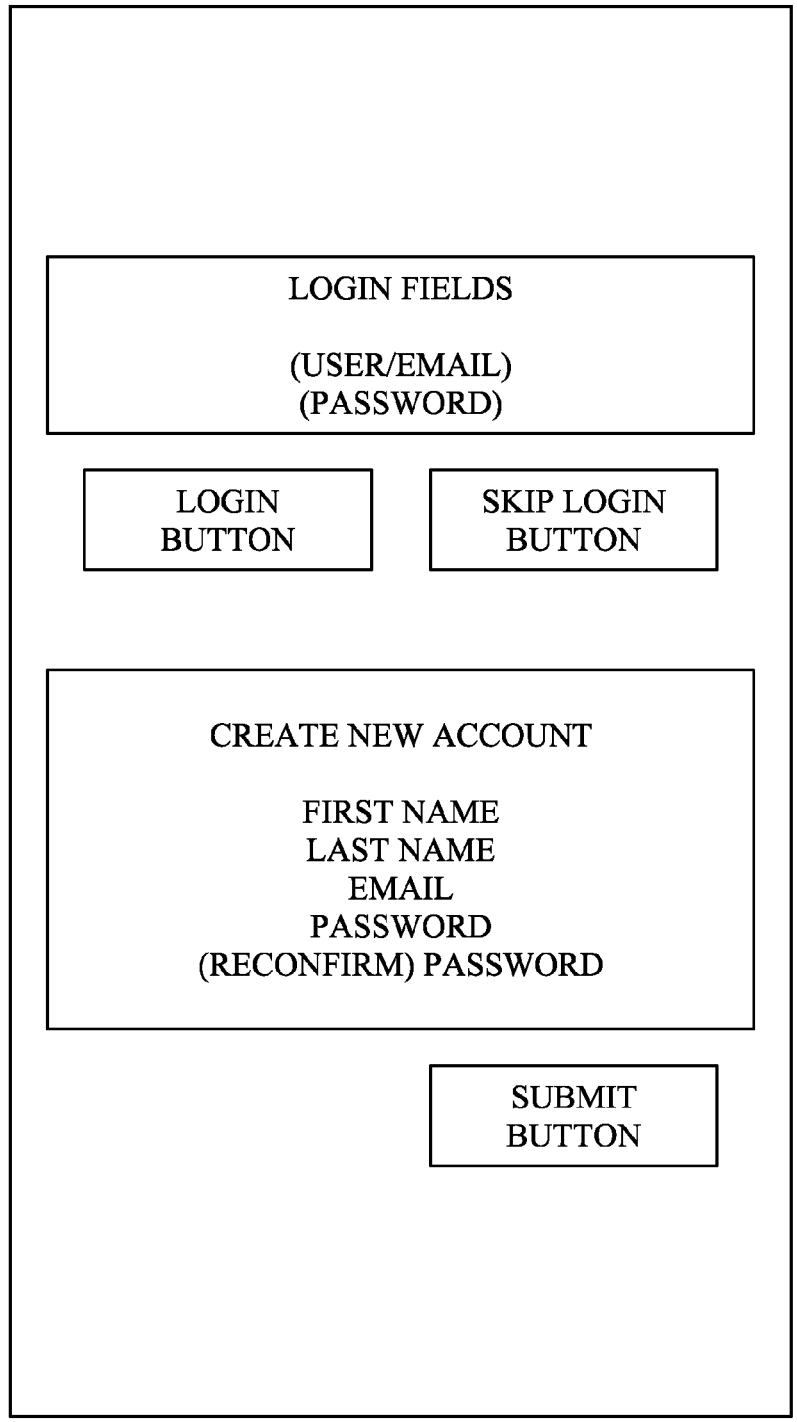
FIGS. 18A-18D are various exemplary display views on a mobile device when an app is used.

FIG. 18A is an exemplary view of a login screen, which allows the cloud server to know which device is communicating therewith. The user is asked to login using an existing account or can create a new one. The user can also skip the login. If the user creates a login along with the user data the token generated using the a method is pushed to the database. The token is used for unique identification of the device.

Figure 18B:
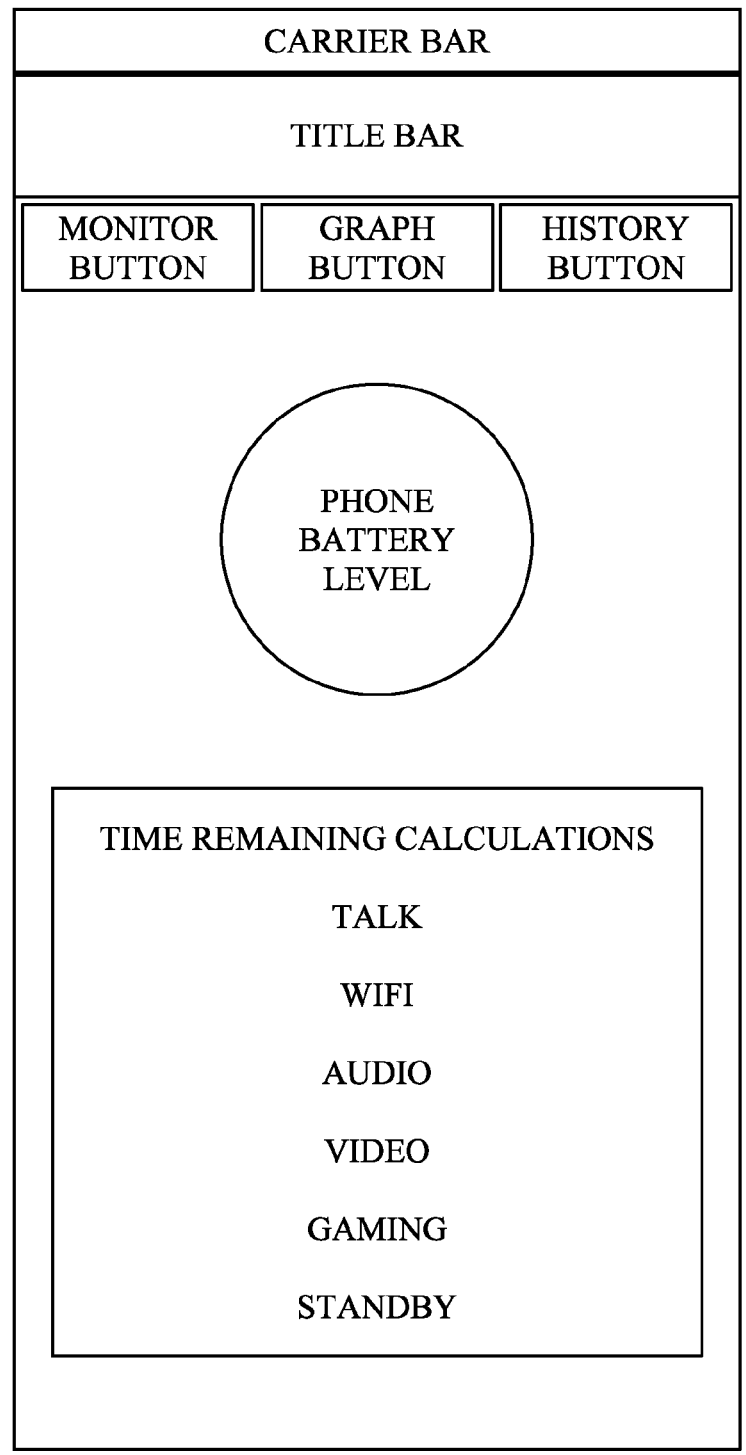

FIG. 18B is an exemplary monitor view, which displays the user's current mobile device battery level along with estimates of remaining battery life when using the phone for common tasks. Once the view is loaded the device battery is calculated and the level is displayed in the battery gauge. Along with the battery percentage, the following details are also calculated: Talk Time, Wi-Fi, Audio, Video, Gaming and Stand By. Once the battery percentage is calculated, information such as battery percentage, ID token, charge status, time, location, are pushed to a database.

Figure 18C:
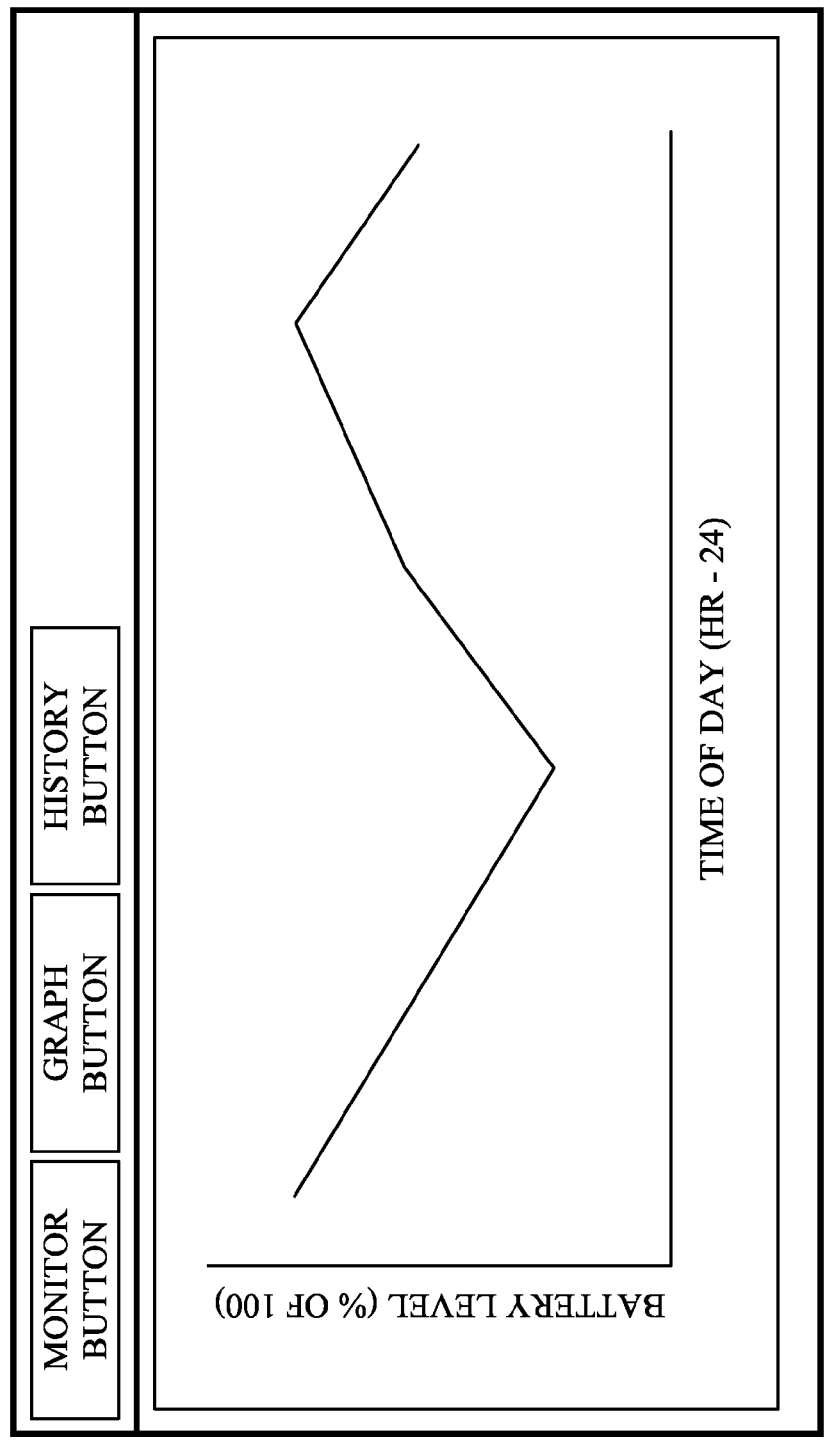

FIG. 18C is an exemplary graph view, which pulls details of the current day by default. It can also display a previous day's battery details if selected from the "Calendar" view. Data is displayed for previous days as pulled from the database and plots graph between time of day (on X axis) and battery percentage (on Y axis).

Figure 18D:
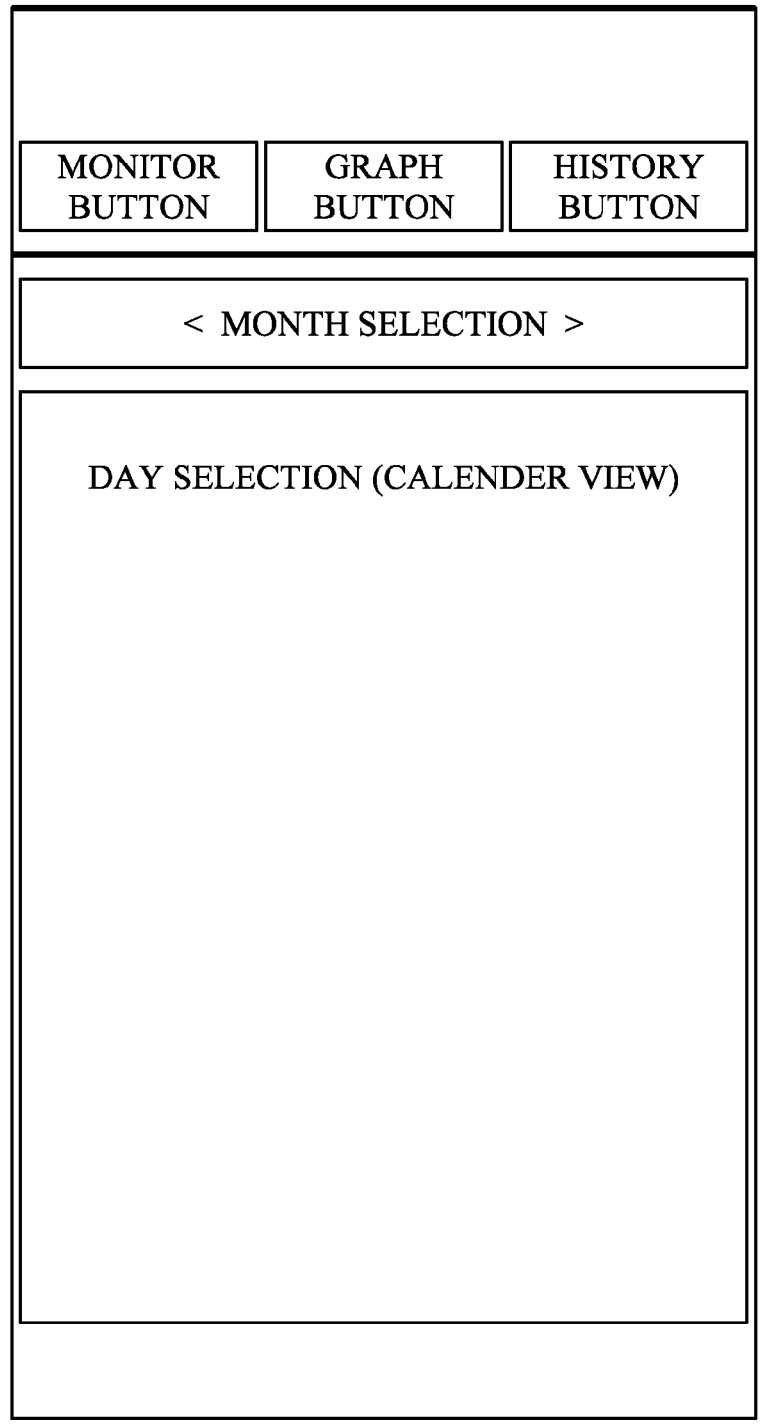

FIG. 18D is an exemplary view, which displays the calendar view, where the user can see the graph only for the selected day. This view is accessible only to the logged in users. Used an external "Calendar Framework" to draw the calendar.

Communication protocol of Bluetooth is as follows. When the cellphone battery voltage is low, the App (application software of cellphone) transfers a series of data to the Bluetooth module. The data format is as following: NUMBER, CMD, DIRECTION, DATA[1], DATA[2], DATA[3], DATA[4], CHK. When the backup power receives the correct data, MCU turns on the discharging circuit.

FIGS. 14-17 illustrate a battery charger 2000. Battery charger 2000 has the ability to both charge two independent battery cells 2005 and 2010, shown, for example, in FIGS. 16A-16B, as well as act as a source of electric power for an additional battery powered mobile device. FIGS. 14A-16B commonly illustrate various views of the battery charge 2000. As illustrated therein, the battery charger 2000 includes front and back face walls 2210 and 2220 and a left side wall 2230, a right side wall 2240, a top side wall 2250, and a bottom side wall 2260 that together form the perimeter of the case that reside between the front and back faces. The outer surface of the walls 2210, 2220, 2230, 2240, 2250 and 2260 can have a textured or smooth exterior surface.

As best illustrated in FIGS. 14C-14D, 15A-15B and 16A-16B, the battery charger 2000 includes left side wall 2230 and right side wall 2240, each of which are defined by inner and outer surfaces 2231, 2232 and 2241, 2242. The battery charger 2000 also includes top side wall 2250 defined by inner and outer surfaces 2251, 2252. The battery charger 2000 also includes bottom side wall 2260 defined by outer surface 2262. Displaced from outer surface 2262 is an inner surface 2261. Together, inner surfaces 2231, 2241, 2251 and 2261 define a battery cavity that is sized to hold two separate battery cells 2005, 2010.

Between outer surface 2262 of bottom side wall 2260 and inner surface 2261 is a nested portion 2280. Nested portion 2280 is a flat surface extending from outer surface 2262 of bottom side wall 2260 and inner surface 2261 that can contain electrical circuitry for use in the battery charger. Nested portion 2280 can define a power switch aperture 2285, through which a power switch 2290 can extend therethrough. Nested portion 2280 can further define status lighting apertures 2292, 2294, through which status lights 2296, 2298 can extent therethrough. Status lights 2296 and 2298 are preferably light emitting diodes (LEDs), and are used to indicate the status of each battery placed in charger 2000. For example, each status light 2296 and 2298 might emit a specific color depending on the state of charge of a battery inserted into the position corresponding to that light. For example, a red color could indicate that the battery installed in the charging position corresponding to that status light is charging, while a green color could indicate a full charge. Likewise, flashing status lights 2296 and 2298 could be used to indicate battery status.

To facilitate charging of separate battery cells 2005 and 2010, charging leads 2270, 2272 placed within the battery cavity in a position that allows each to independently make electrical contract with corresponding charging leads 2274, 2276 located on a respective one of the battery cells 2005, 2010. In one embodiment, charging leads 2270 and 2272 of battery charger 2000 are displaced from each other so that charging lead 2270 is in close proximity to the inner surface 2231 of left side wall 2230 while charging least 2272 is in close proximity to the inner surface 2241 of right side wall 2240. Such an arrangement allows for insertion of batteries such that the respective charging leads 2274 and 2276 of the separate battery cells 2005 and 2010 are at opposing side walls 2230 and 2240 of the charger 2000. This allows for easier insertion and removal of battery cells 2005 and 2010, as well as reducing the possibility that charging lead 2274 of battery 2010 will contact the charging lead 2276 for battery cell 2005 during insertion or removal. Since battery cell 2010 will be in a lower position in the battery cavity than will battery 2005, inadvertent contact between charging leads 2272 of the battery charger and charging lead 2274 of battery 2010 would be possible if charging leads 2270 and 2272 were in vertical alignment with each other, and such contact would be highly undesirable.

The circuitry used to control charging of battery cells 2005 and 2010 can be placed on a lower printed circuit board 2100 and an upper printed circuit board 2012 located within the space defined by the nested portion 2280. In the embodiment illustrated in FIGS. 16A-16B, status lights 2296 and 2298 are installed on upper printed circuit board 2102 so that each can extend through status lighting apertures 2292, 2294, respectively. Power button and associated circuitry and switches are also installed on upper printed circuit board 2102 so that power button extends through power button aperture 2085. Likewise, charging lead 2270 is placed on lower printed circuit board 2100 while charging lead 2272 is placed on upper printed circuit board 2102. Each charging lead 2270 and 2272 is arranged so that the terminals thereon extend into the charging cavity.

Battery charger 2000 can be constructed so that its housing 2001 is assembled from several molded plastic parts. Housing 2001 can be constructed of a main housing 2109 that defines left side wall 2230 (as well as inner and outer surfaces 2231, 2232), right side wall 2240 (as well as inner and outer surfaces 2241, 2242, top side wall 2250 (as well as inner and outer surfaces 2251, 2252), and bottom side wall 2260 (as well as outer surface 2262), and inner surface 2261. A flat base 2110 suitable for resting on a flat surface can be affixed to housing 2001 in any manner deemed appropriate. A shield 2112 can be sandwiched between the flat base 2110 and the housing 2001. Housing 2001, shield 2112 and flat base 2110 can be joined using various methods, include, adhesives, screws and heat.

Housing 2001 includes a USB aperture 2015, though which a connector 2020 can pass therethrough. In one embodiment, connector 2020 is a USB connector 2020, and can be placed on lower printed circuit board 2100. Connector 2020 can receive a charging cable (not shown) that can supply charging current to external devices that are cable of being charged via connector (for example, a USB port). Thus, when battery cells 2005 and 2010 (or only one of them) is placed in the charger 2000, a user can charge an additional mobile device. Batteries 2005 and 2010 preferably have the same form factor as battery 40 that can be installed in protective case 10. Thus, battery charger 2000 can be used to charge two battery cells 2005 and 2010. Once battery cells 2005 and 2010 are charged, one of those battery cells, e.g., battery cell 2005, can be inserted into battery aperture 22 of battery case 10, while the second battery cell, e.g., battery cell 2010, can be left in battery charger 2000. A user could then connect a mobile device though a charging cable, e.g., charging cable 1010, to connector 2020, and use the charge stored in battery cell 2010, to charge the connected mobile device.

Figure 17:
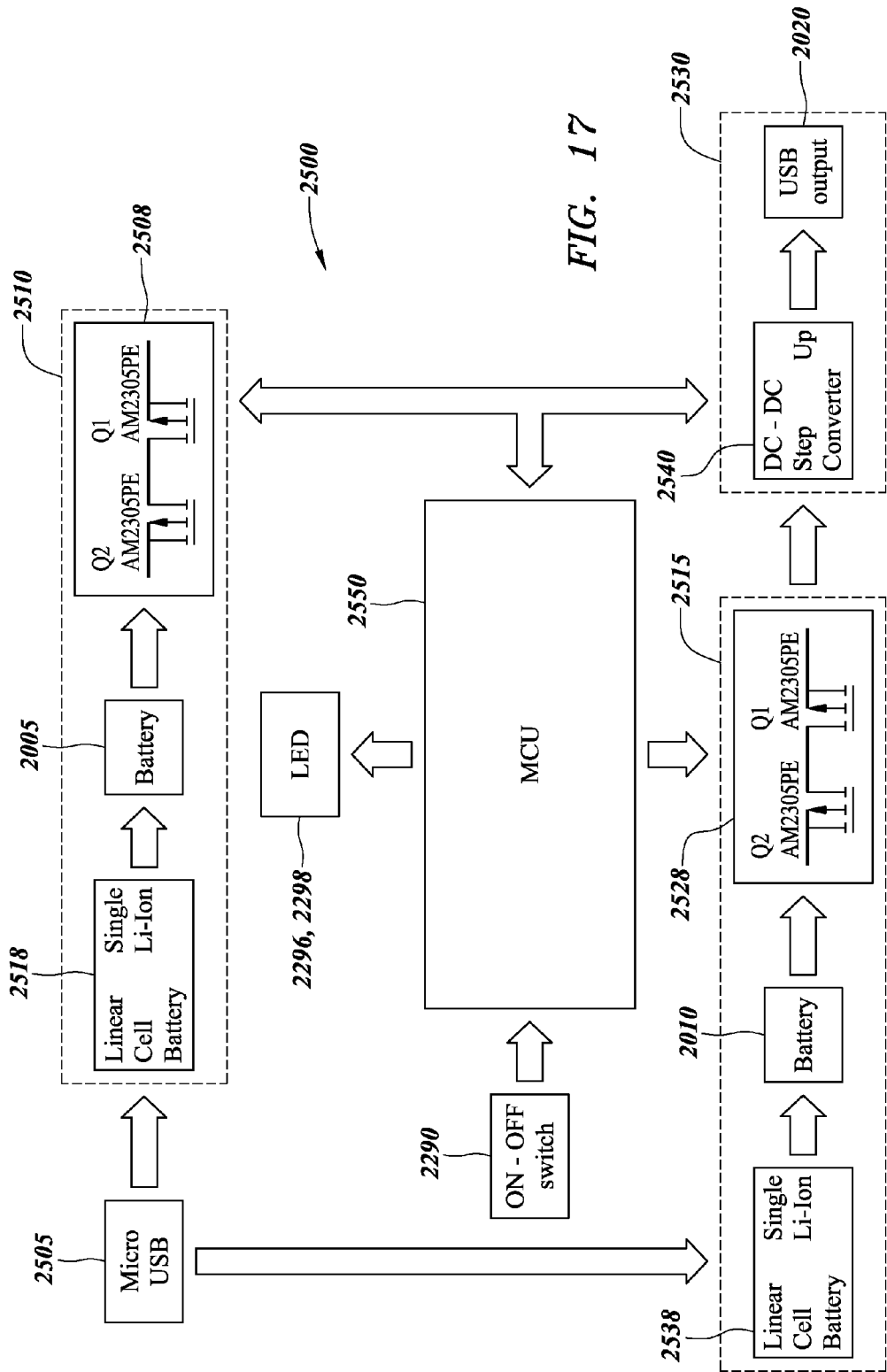
FIG. 17 is a block diagram illustrating circuitry of a battery charger as in FIG. 14.

FIG. 17 is a block diagram showing the charging and control circuitry 2500 used to charge battery cells 2005 and 2010. As discussed, charging and control circuitry is placed on upper and lower printed circuit boards 2102 and 2100. Electric current is supplied by a power supply through charging port 2505. While a micro-USB port 2505 is shown, any type of port will be sufficient, as will any other manner/connector in which current can be supplied to charging and control circuit 2500. Current input through charging port 2505 is input to two charging circuits, first charging circuit 2510 and second charging circuit 2515, in parallel, as the parallel arrangement provides heretofore unavailable benefits.

First charging circuit 2510 receives charging current from port 2505 and inputs this current into a battery charging device 2518. In one embodiment, battery charging device is a linear single cell lithium ion battery charging device. Battery charging device 2518 controls the charging current sent to battery cell 2005. Battery cell 2005 is coupled to transistors 2508. Second charging circuit 2515 also receives charging current from port 2505 and inputs this current into a battery charging device 2538. In one embodiment, battery charging device 2538 is a linear single cell lithium ion battery charging device. Battery charging device 2538 controls the charging current sent to battery cell 2010. Battery cell 2010 is coupled to transistors 2528.

Charging and control circuitry 2500 further includes a microcontroller 2550. Microcontroller 2550 can independently control the charging of battery cells 2005 and 2010, and is coupled to transistors 2508, 2528, which enables such control. Microcontroller 2550 is also coupled to an on/off switch 2290 that controls battery charger 2000. Various combinations of button actuations can be used to control charger 2000. For example, a single actuation could either turn the charger on or off, depending on the state of charger 2000. Actuation and maintaining actuation of the on/off switch could also be used to select a specific one of the battery cells 2005, 2010 for charging, or could be used to enable charging of an external device, as will be discussed below. Microcontroller 2550 also controls illumination of LEDs 2296, 2298.

Microcontroller 2550 enables charging of battery cells 2005 and 2010 with various logic. For example, with both battery cells 2005 and 2010 placed in charger 2000, microcontroller 2550 can charge both at the same rate. Alternatively, charger 2000 can prioritize charging of one battery of the other. For example, a user may prefer to have battery cell 2005, which is placed at the upper position of charger 2000, to be charged first. Microcontroller 2550 can thus be programmed to prioritize battery cell 2005, directing most or all of charging current to that particular battery cell.

In an embodiment of charger 2000, charging circuit 2515 is coupled to an external device charging circuit 2530. External device charging circuit 2530 comprises a DC-DC step up converter 2540 that receives current from battery 2010 through transistors 2528. DC-DC step up converter 2540 steps the output voltage of battery 2010 up to the proper voltage needed to power an external device connected to port 2020 through a charging cable 1010. Microcontroller 2550 can enable DC-DC step up converter 2540 to allow supply of power to a connected external device.

The battery charger 2000 can also contain a wireless module (not shown) that can communicate with a corresponding wireless module on a mobile device. The app connects to the battery charger via a wireless connection, e.g., Bluetooth Low Energy, and monitors the battery life on the bank. The app can calculate the approximate time to discharge and recharge for the battery bank (i.e. if it's connected and discharging, how many hours/min are remaining vs. if it's charging from a wall outlet, how many hours/min are remaining to full charge). The app also acts as a remote control, activating and deactivating the individual ports on the case, and has an alert ("Find Me") button to sound a beep on the case to locate it when lost.

Figure 19:
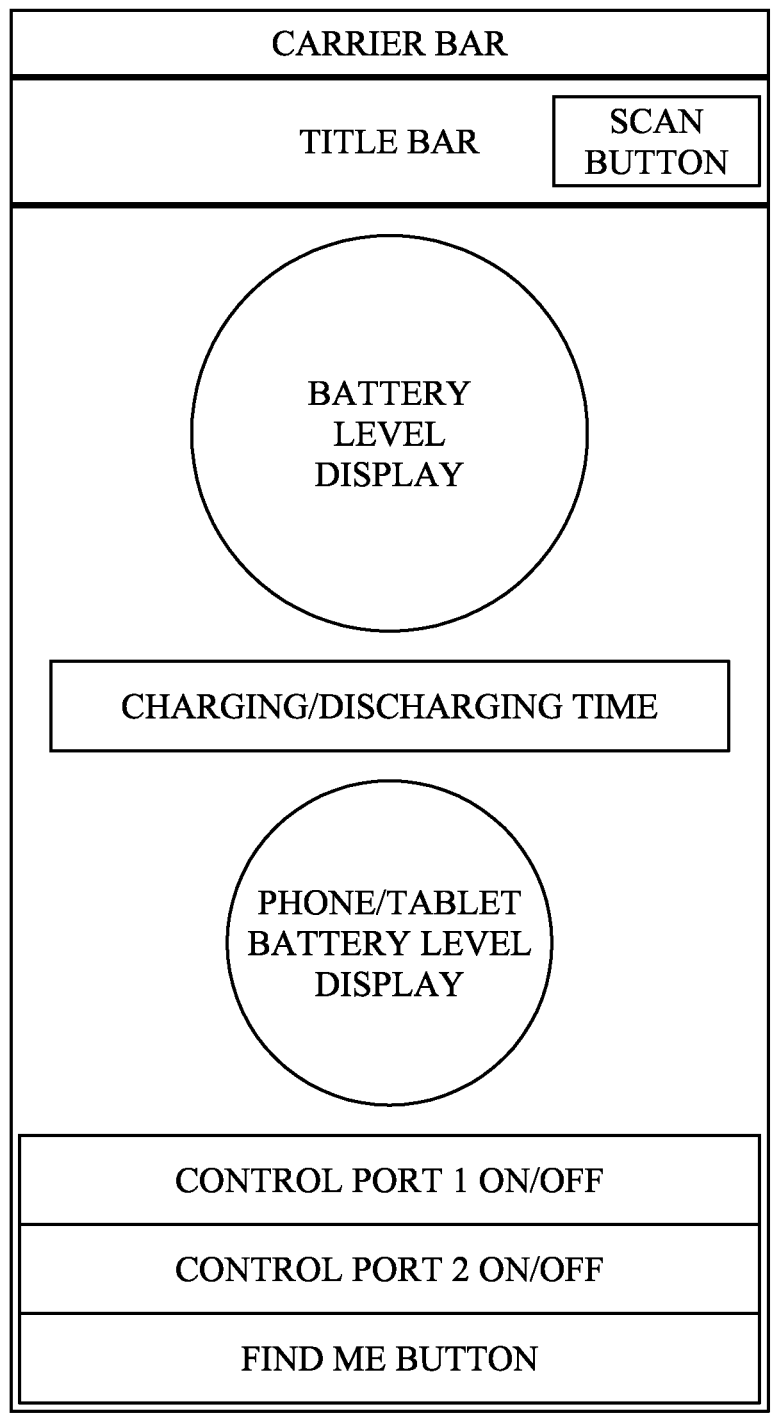
FIG. 19 is an exemplary battery status display view on a mobile device when an app is used.

Upon starting the app, a splash screen can be displayed on the screen of the mobile device. FIG. 19 is an exemplary primary battery status view. It is also where the remote battery connection is setup. The logic of the app is as follows:

Establishing the Connection:
Check for BLE connection availability:
Scan for peripherals:
   If the "Bluetooth Central Manager" is "powered on" the central manager calls method to scan for available peripherals.
   if peripherals are detected and lists the available peripherals.
Select devices from list with the name of the case as prefix:
   Connection is established with a peripheral having prefix name as the name of the case
Peripheral service discovery and connection:
   Once the connection is established with the peripheral, peripheral starts discovering services
   Once the service (custom service) is detected the peripheral starts discovering characteristic for the identified service.
   Once the peripheral identifies a characteristic for the identified service, the "Output Port 1", "Outport 2" and "Find me key" buttons are enabled
Write/Read/Notify Commands:
Notify:
   Battery Status Value Updates:
     The notify me characteristic calls the method whenever there is an update in the battery percentage. Once the battery percentage is calculated the "percentage circles" animation code is called.
     The two circles represent the "peripheral percentage" [top] and "device percentage" (iPhone/smartphone/tablet) [bottom].
Write/Read:
   The peripheral uses method to turn on port1, port2 and find me key.
   Toggle on/off Port 1:
   Toggle on/off Port 2:
   Find Me Button:
Exemplary service profile information are provided below.

Portable Power Charging Status Profile

When the Portable Power is charging, MCU transfers current battery capacity, usage cycles and remaining charging time (hour, minutes) to BLE, and then BLE transfers these data to APP. Following is an exemplary data format: NUMBER, CMD, DIRECTION, DATA[0], DATA[1], DATA[2], DATA[3], DATA[4], CHK. Each byte is definitely defined in the following table.

| Label | Command name | value | property |
| --- | --- | --- | --- |
| NUMBER | length of the command | 0x09 | read |
| CMD | charging status information | 0x0A | read |
| DIRECTION | BLE->App | 0x11 | read |
| DATA[0] | battery remaining capacity | 0x44 | read |
| DATA[1] | usage cycle (high byte) | 0x12 | read |
| DATA[2] | usage cycle (low byte) | 0x34 | read |
| DATA[3] | remaining charging time (hours) | 0x2 | read |
| DATA[4] | remaining charging time (mins) | 0x30 | read |
| CHK | XOR checksum | 0x42 | read |

Portable Power Discharging Status Profile

When the Portable Power is discharging, MCU transfers current battery capacity, usage cycles and remaining discharging time (hour, minutes) to BLE, and then BLE transfers these data to APP. Following is an exemplary data format: NUMBER, CMD, DIRECTION, DATA[0], DATA[1], DATA[2], DATA[3], DATA[4], CHK. Each byte is definitely defined in the following table.

| Label | Command name | value | property |
| --- | --- | --- | --- |
| NUMBER | length of the command | 0x09 | read |
| CMD | discharging status information | 0x0B | read |
| DIRECTION | BLE->App | 0x11 | read |
| DATA[0] | battery remaining capacity | 0x56 | read |
| DATA[1] | usage cycle (high byte) | 0x12 | read |
| DATA[2] | usage cycle (low byte) | 0x34 | read |
| DATA[3] | remaining discharging time (hour) | 0x3 | read |
| DATA[4] | remaining discharging time (mins) | 0x08 | read |
| CHK | XOR checksum | 0x68 | read |

Search Battery Profile

To search battery, cellphone App software transfers a series data to BLE. Following is an exemplary data format: NUMBER, CMD, DIRECTION, DATA[0], DATA[1], DATA[2], DATA[3], DATA[4], CHK. Each byte is definitely defined in the following table.

| Label | Command name | value | property |
| --- | --- | --- | --- |
| NUMBER | length of the command | 0x09 | write |
| CMD | Search battery command | 0x0C | write |
| DIRECTION | App -> BLE | 0x22 | write |
| DATA[0] | "BLANK" ASCII VALUE | 0xFF | write |
| DATA[1] | "BLANK" ASCII VALUE | 0xFF | write |
| DATA[2] | "BLANK" ASCII VALUE | 0xFF | write |
| DATA[3] | constant | 0x68 | write |
| DATA[4] | constant | 0x86 | write |
| CHK | XOR checksum | 0x36 | write |

Turn On 2.4 A Output

The user press the 2.4 amperes button first, App software transfers a batch of data to BLE. Data. Following is an exemplary data format: NUMBER, CMD, DIRECTION, DATA[0], DATA[1], DATA[2], DATA[3], DATA[4], CHK. Each byte is definitely defined in the following table:

| Label | Command name | value | property |
| --- | --- | --- | --- |
| NUMBER | length of the command | 0x09 | write |
| CMD | turn on 2.4 A discharging circuit | 0x05 | write |
| DIRECTION | App -> BLE | 0x22 | write |
| DATA[0] | 'O' ASCII VALUE | 0x4F | write |
| DATA[1] | 'N' ASCII VALUE | 0x4E | write |
| DATA[2] | "BLANK" ASCII VALUE | 0XFF | write |
| DATA[3] | '2' ASCII VALUE | 0x32 | write |
| DATA[4] | '4' ASCII VALUE | 0x34 | write |
| CHK | XOR checksum | 0xD6 | write |

Turn Off 2.4 A Output

The user press the 2.4 amperes button second, App software transfers a batch of data to BLE. Following is an exemplary data format: NUMBER, CMD, DIRECTION, DATA[0], DATA[1], DATA[2], DATA[3], DATA[4], CHK. Each byte is definitely defined in the following table.

| Lable | Command name | value | property |
|---|---|---|---|
| NUMBER | lenth of the command | 0x09 | write |
| CMD | turn off 2.4 A discharging circuit | 0x07 | write |
| DIRECTION | App -> BLE | 0x22 | write |
| DATA[0] | 'O' ASCII VALUE | 0x4F | write |
| DATA[1] | 'F' ASCII VALUE | 0x46 | write |
| DATA[2] | 'F' ASCII VALUE | 0x46 | write |
| DATA[3] | '2' ASCII VALUE | 0x32 | write |
| DATA[4] | '4' ASCII VALUE | 0x34 | write |
| CHK | XOR checksum | 0x65 | write |

Turn On 1 A Output

The user press the 1 ampere button first, App software transfers a batch of data to BLE. Following is an exemplary data format: NUMBER, CMD, DIRECTION, DATA[0], DATA[1], DATA[2], DATA[3], DATA[4], CHK. Each byte is definitely defined in the following table.

| Label | Command name | value | property |
|---|---|---|---|
| NUMBER | length of the command | 0x09 | write |
| CMD | turn on 1 A discharging circuit | 0x06 | write |
| DIRECTION | App -> BLE | 0x22 | write |
| DATA[0] | 'O' ASCII VALUE | 0x4F | write |
| DATA[1] | 'N' ASCII VALUE | 0x4E | write |
| DATA[2] | "BLANK" ASCII VALUE | 0xFF | write |
| DATA[3] | '1' ASCII VALUE | 0x31 | write |
| DATA[4] | '0' ASCII VALUE | 0x30 | write |
| CHK | XOR checksum | 0xD2 | write |

Turn Off 1 A Output

The user press the 1 ampere button second, App software transfers a batch of data to BLE. Following is an exemplary data format: NUMBER, CMD, DIRECTION, DATA[0], DATA[1], DATA[2], DATA[3], DATA[4], CHK. Each byte is definitely defined in the following table.

| Label | Command name | value | property |
|---|---|---|---|
| NUMBER | length of the command | 0x09 | write |
| CMD | turn off 1 A discharging circuit | 0x04 | write |
| DIRECTION | App -> BLE | 0x22 | write |
| DATA[0] | 'O' ASCII VALUE | 0x4F | write |
| DATA[1] | 'F' ASCII VALUE | 0x46 | write |
| DATA[2] | 'F' ASCII VALUE | 0x46 | write |
| DATA[3] | '1' ASCII VALUE | 0x31 | write |
| DATA[4] | '0' ASCII VALUE | 0x30 | write |
| CHK | XOR checksum | 0x61 | write |

Figure 20:
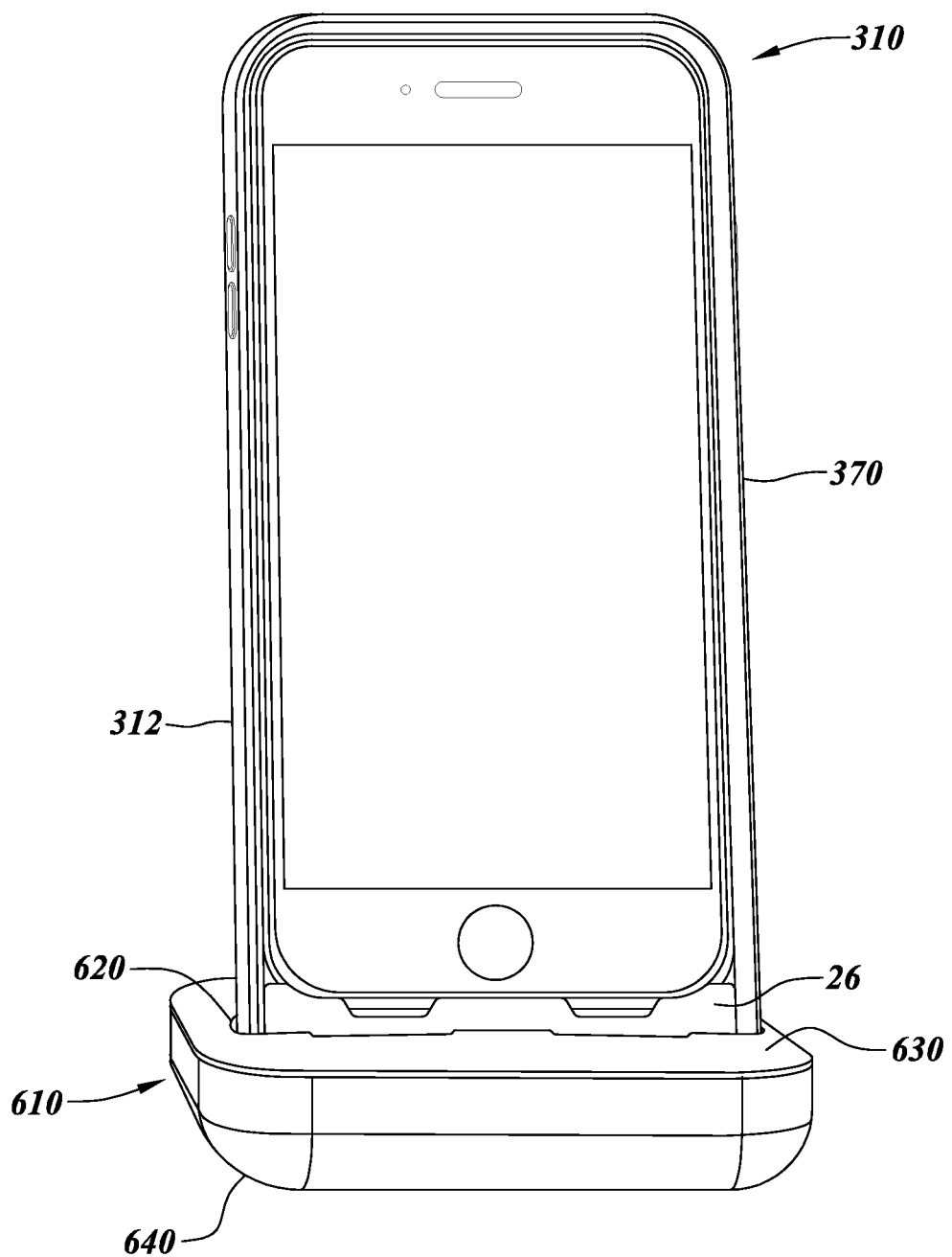
FIG. 20 is a perspective view of an implementation of a battery case and charging dock system.

As previously summarized, FIG. 20 is a perspective view of an implementation of a battery case 310 and a battery case dock 610 configured for an Apple iPhone, which is depicted as being housed therein. FIGS. 21A-H and 22-23 are illustrations of the battery case 310 thereof and FIGS. 23A-D are illustrations of the dock 610. The battery case 310 can employ the same circuitry described above in connection with FIG. 13. The circuitry employed may include the wireless module 410 described above to control current supply from the battery case to the mobile device. Alternatively, the battery case 310 may employ circuitry that does not include such a wireless module 410 and relies on user intervention to trigger charging of the internal batter of the mobile device as previously described. The various features depicted in FIGS. 20-23, are described with additional detail below.

As depicted in FIG. 20, the battery case 310 is configured externally to fit and mate within the cavity 620 formed in the upper surface 630 of the dock 610. The dock 610 is comprised of a housing 615 that defines the upper surface 630 and the opposing lower surface 640, which includes non-slip grip foot pads 641a-d. The cavity 620 is shaped to conform with the outer contour of the bottom-end region 320 of the case 310 (with the mobile device contained therein). Once inserted, the dock 610 supports the battery case 310 (and mobile device therein) on end in an upright position so that the touchscreen on the mobile device is generally perpendicular to the supporting surface (e.g., desk) ith a slight upward tilt. Thus, when the lower surface 640 of the dock 610 is resting on a desk, the touchscreen of the mobile device is configured to be in a readily visible orientation to a user sitting at the desk.

Figure 21A:
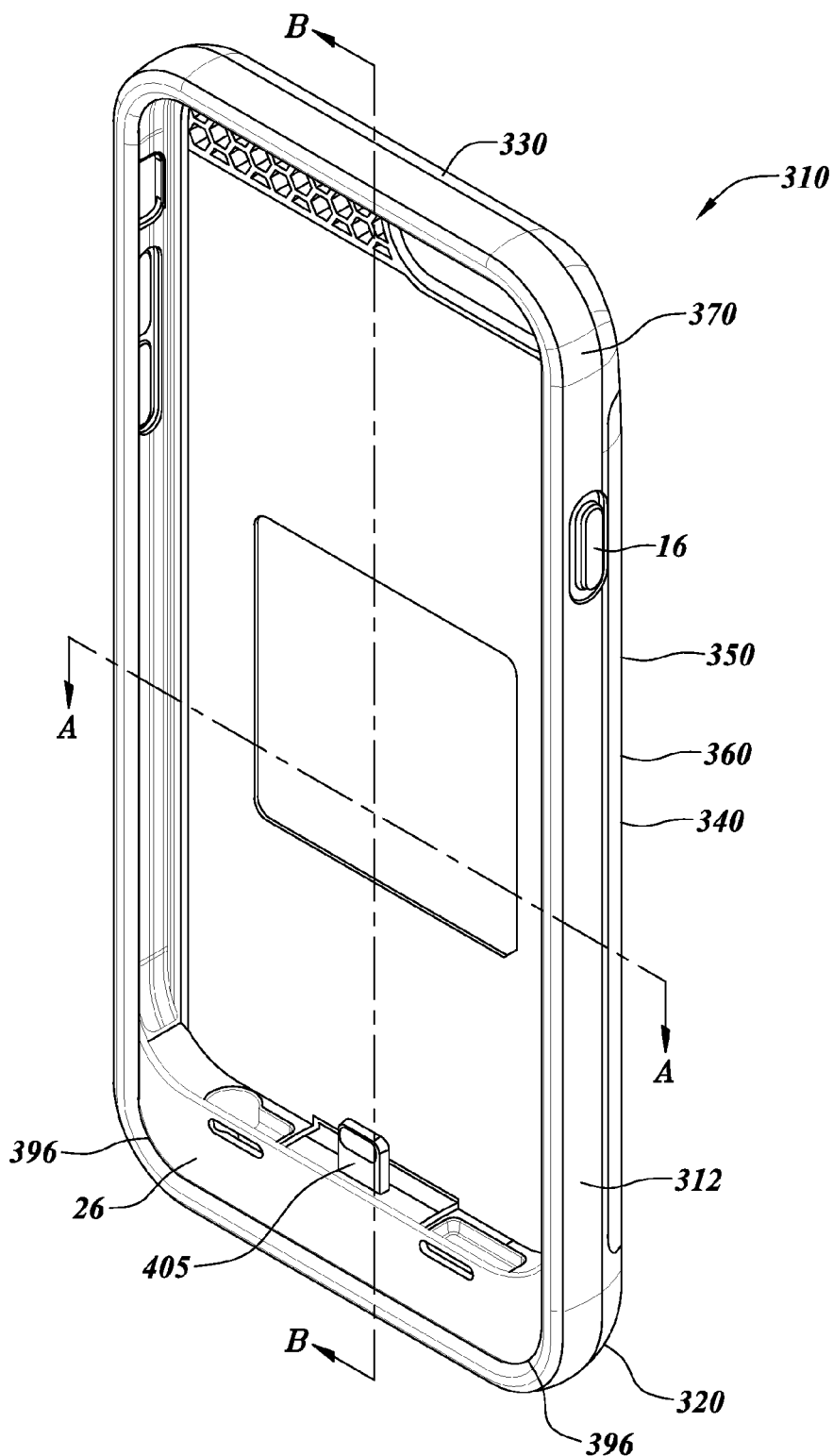
FIGS. 21A-21H are various views of the battery case illustrated in FIG. 20 including a front perspective, front face, rear face, left side, right side, top-end, bottom end and partial exploded views respectively.
Figure 21B:
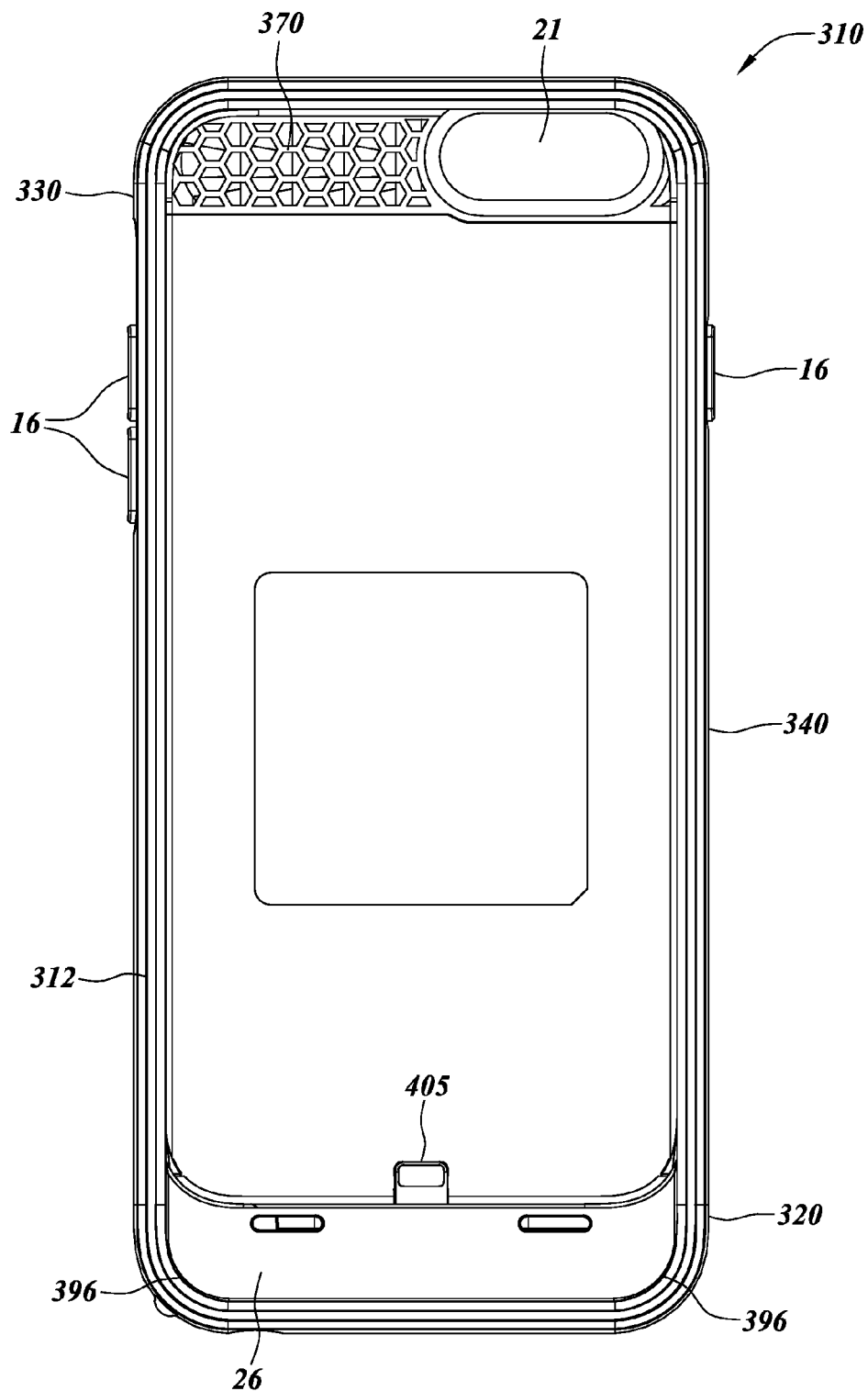
Figure 21C:
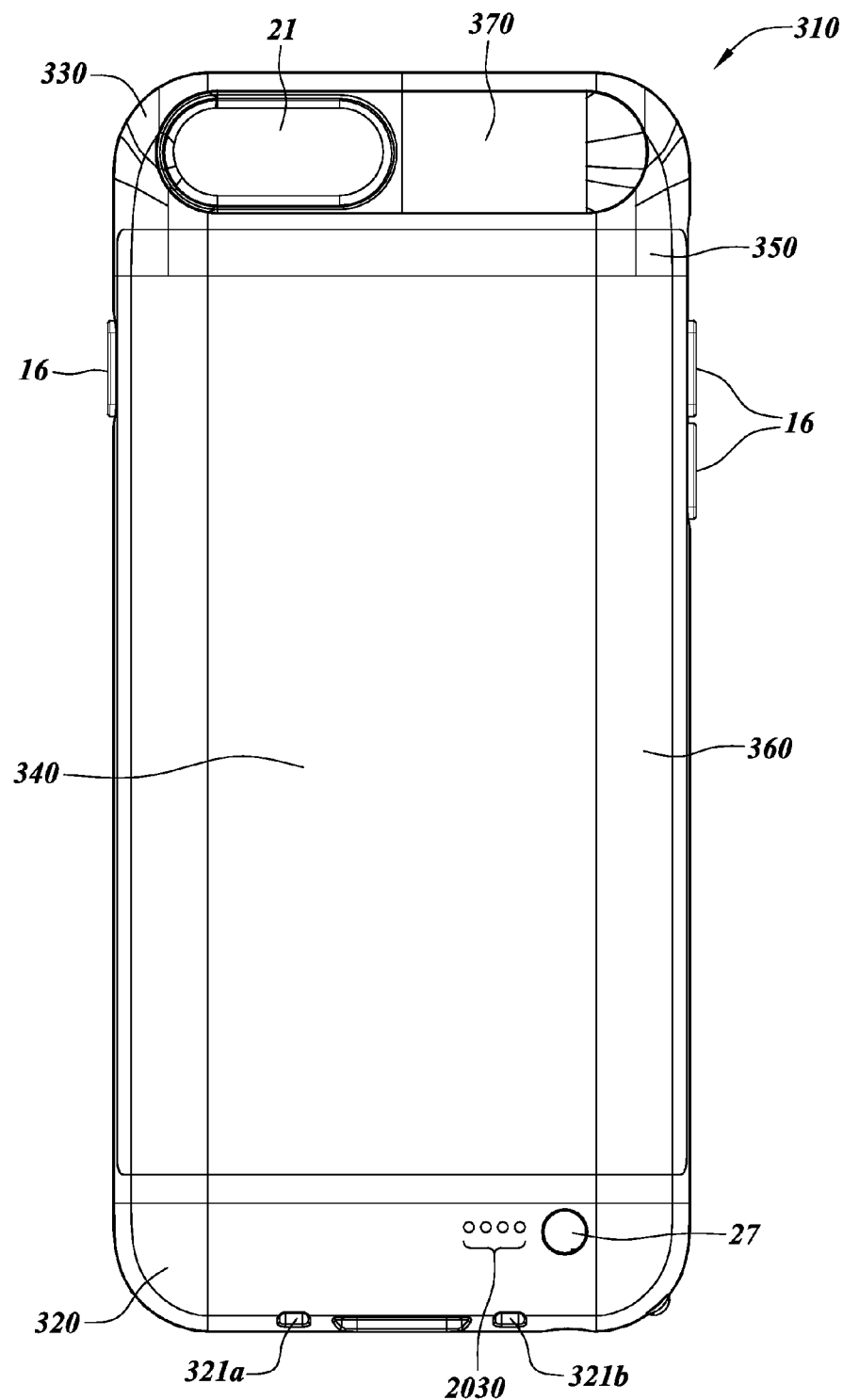
Figure 21D:
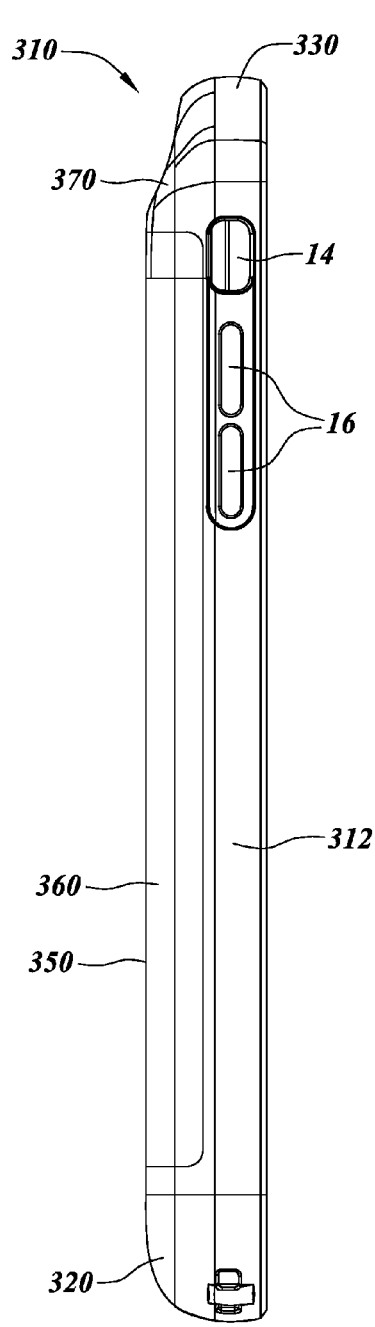
Figure 21E:
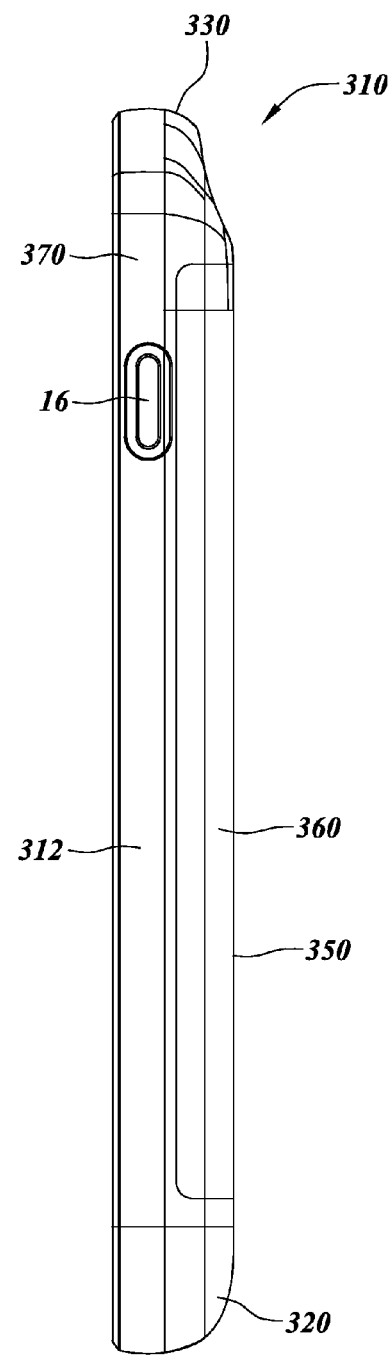
Figure 21F:
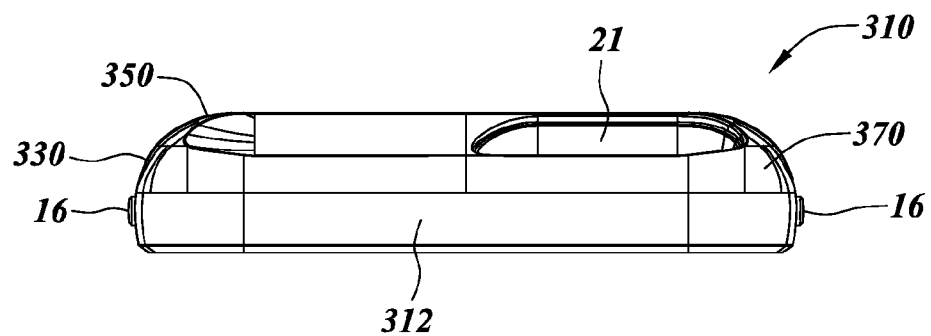
Figure 21G:
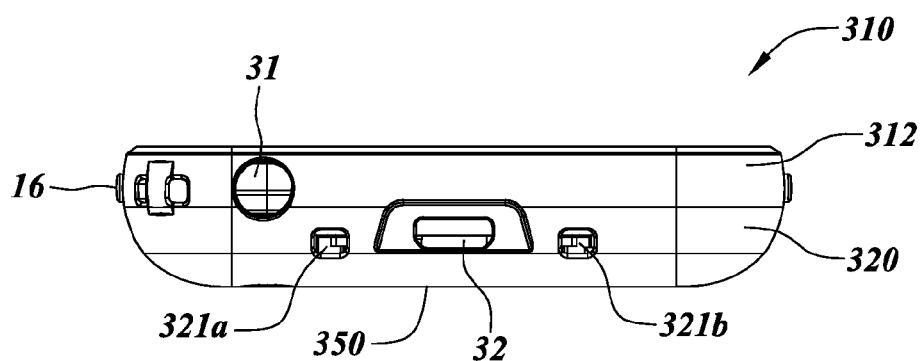
Figure 23A:
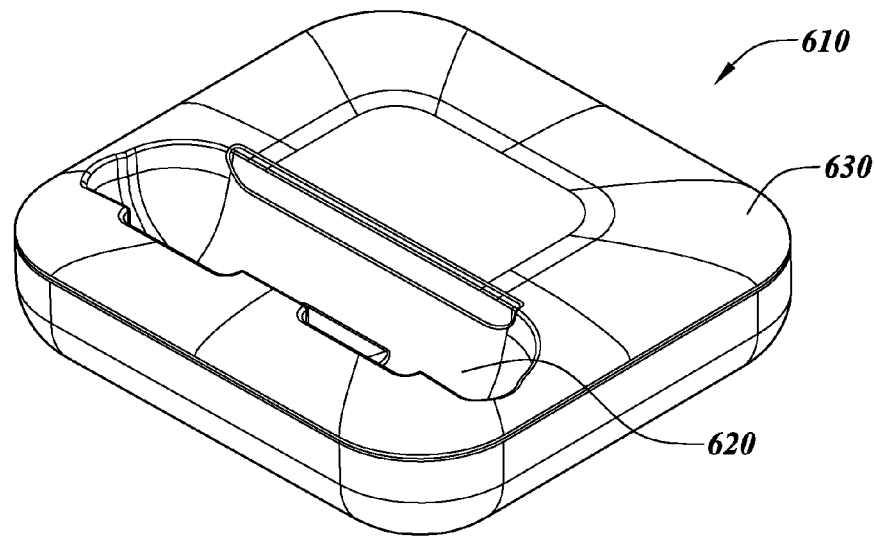
FIGS. 23A-23D are various views of the charging dock depicted in FIG. 20, including top perspective views and a bottom perspective view as shown in FIG. 23D.
Figure 23B:
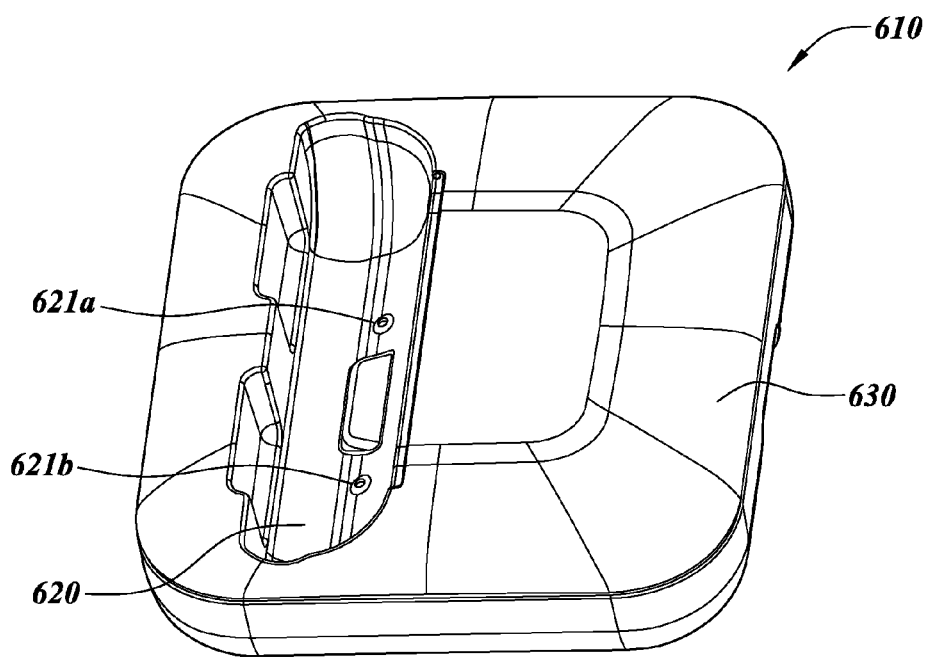
Figure 23C:
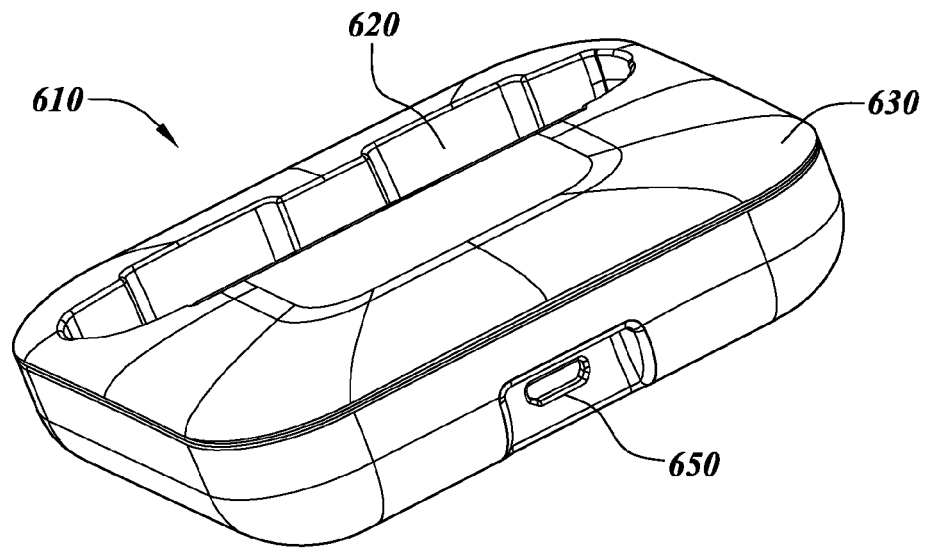
Figure 23D:
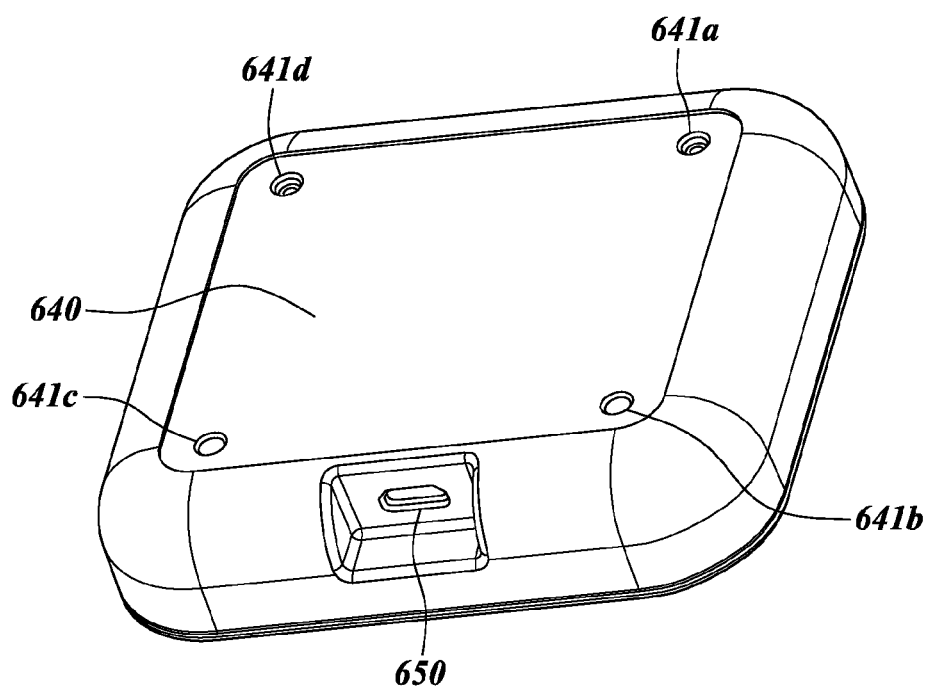

When the case 310 is received within the dock 610, the dock also serves to charge or supply power to the case 310. Power from an external power source (not shown) is transferred via a cable (also not shown) that is plugged into a port or connector 650 on the docke 610 (as best illustrated in FIG. 23D) and transferred therefrom through an electrical connection extending from the connector 650 to spring loaded depressible charging pins 621a and 621b positioned on the external surface of the bottom of the cavity 620 (as best illustrated in FIG. 23B). As illustrated in FIGS. 21C and 21G, a corresponding set of charging contact pins/plates 321a and 321b are positioned on the bottom end region 320 of the battery case 310 in locations configured to be in contact with the depressible charging pins 621a and 621b when the battery case 310 is inserted or seated in the dock 610.

The electrical circuit that carries the current from the connector 650 to spring loaded depressible charging pins 621a and 621b, may be a simple pass through connection that is comprised of two wires or conductors that extend from the power rails of the connector 650 to the charging pins 621a and 621b. The charging pins/plates 321a and 321b on the case 310 may be electrically connected to circuit 400 (illustrated in FIG. 13 and described above) via electrical connections to the power rails of connector 402 so that current may flow to circuit 400 from the external power source connected to the dock 610.

Figure 21H:
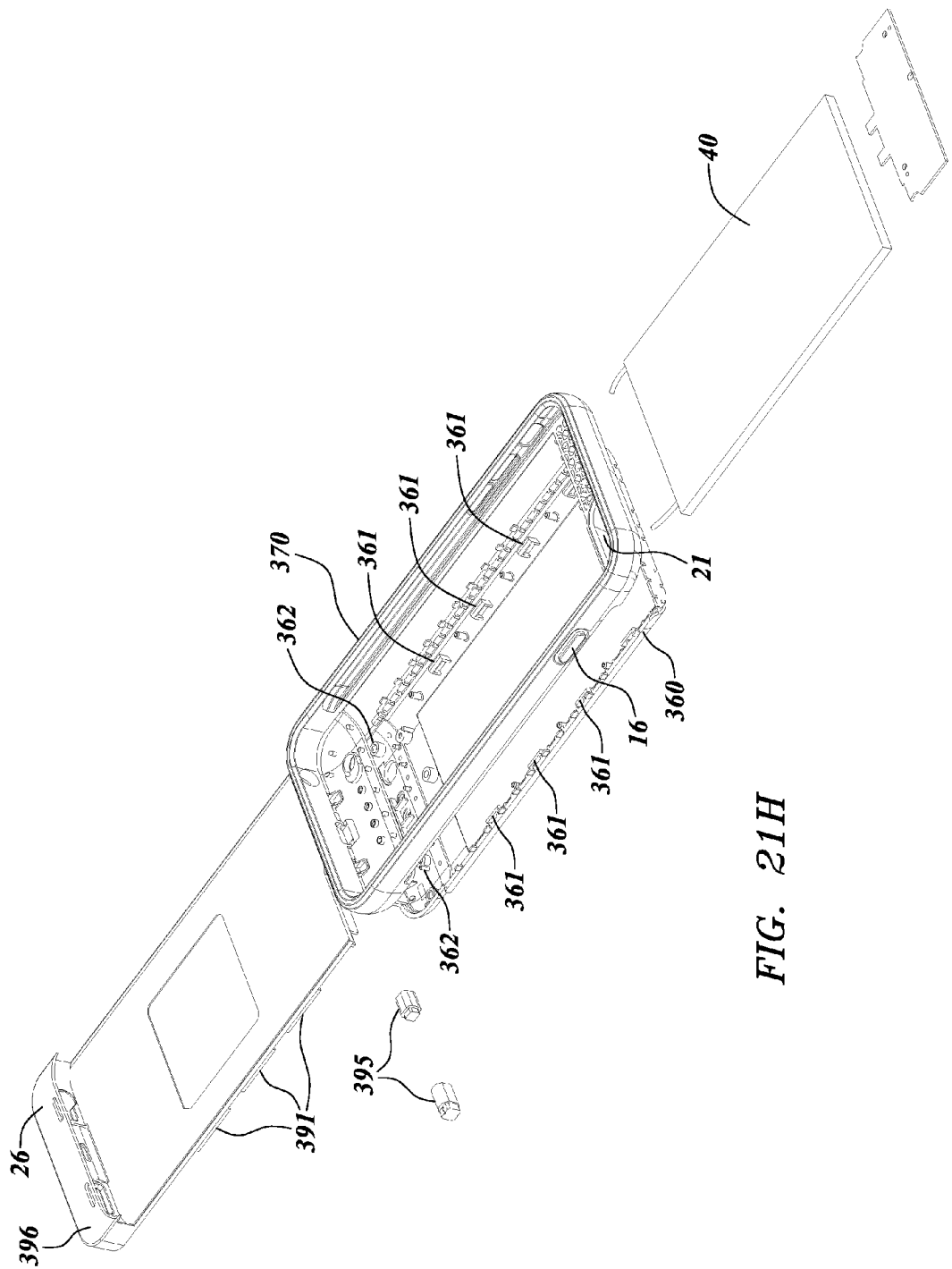
Figure 22A:
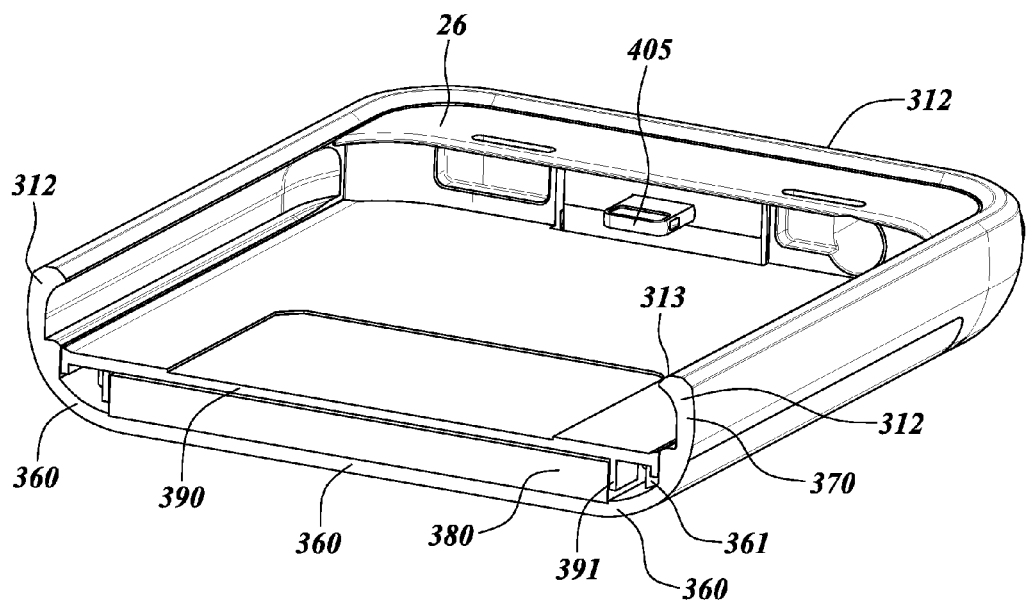
FIG. 22A is cross sectional view of the battery case taken along line A-A illustrated in FIG. 21A.
Figure 22B:
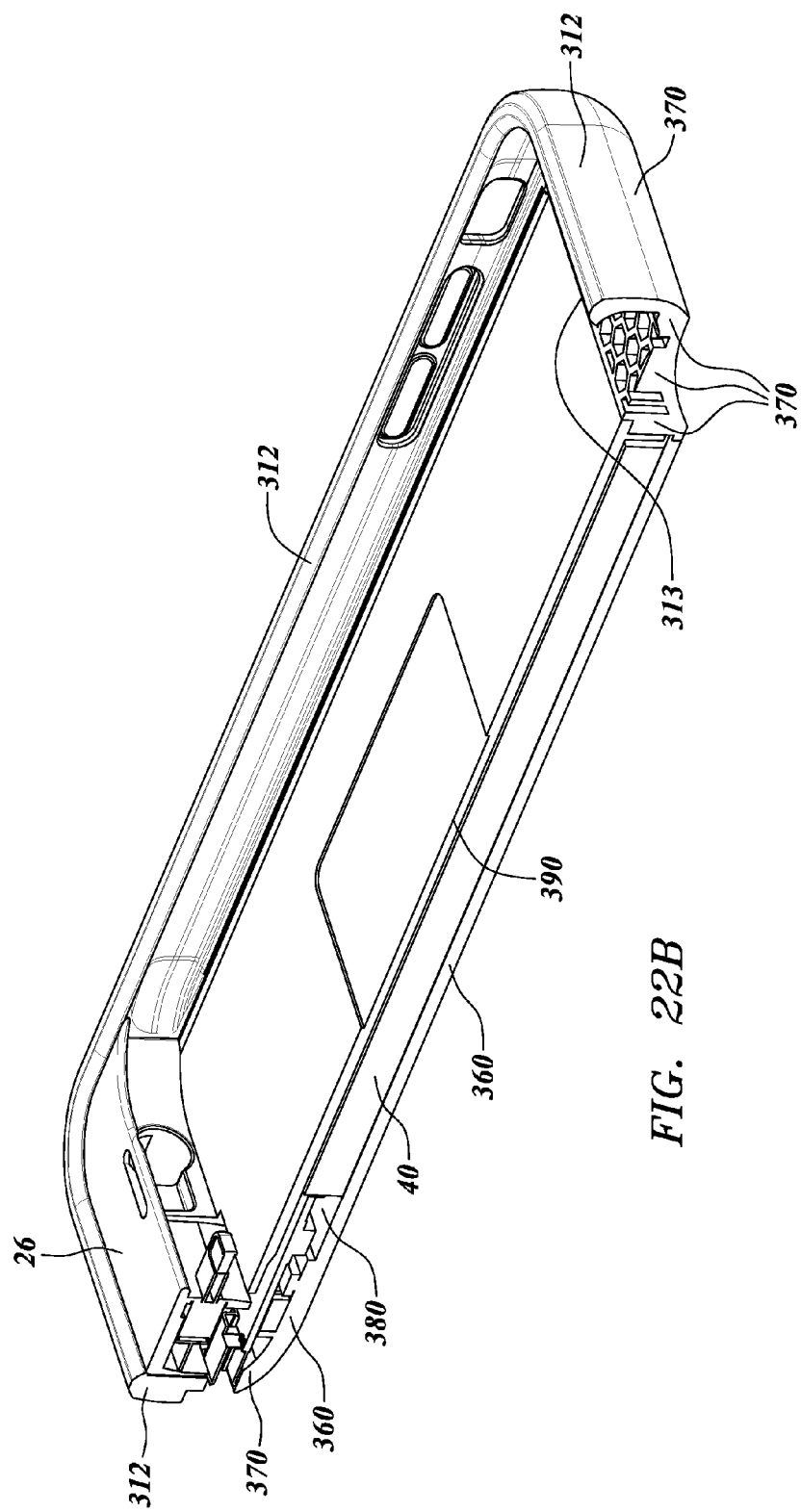
FIG. 22B is cross sectional view of the battery case taken along line B-B illustrated in FIG. 21A.

Referring to FIGS. 21-22, the battery case 310 is comprised of bottom end region 320 that extends to a top end region 330 and a mid-region 340 that resides there-between. The three regions define a curved back surface 350, an integral bumper 312 that extends around and defines the perimeter of the case 310 with the internal surface of the bumper being dimensioned to be in contact with the external perimeter surfaces of the mobile device when the device is inserted in the case 310. The bumper 312 includes an inwardly protruding rim or lip 313 that is configured to extend over the front face of the mobile device to retain the device in the case 310. The back surface 350 is comprised of a rigid panel component 360 that is co-molded to a more elastic and less rigid housing component 370 that forms the top end and bottom end regions, 330 and 320, and the bumper 312. The relatively more rigid panel component 360 may be formed of a relatively rigid or reinforced polymer or plastic such as a polycarbonate or carbon fiber reinforced plastic. The rigid panel component 360 may be formed of metal or wood or some other suitably rigid material. The relatively less rigid and more elastic component 370 may be formed of silicone or some other rubber like material or polymer. The two components 360 and 370 are co-molded together to form a unitary structure or housing that defines an open cavity 380 that houses the rechargeable battery 40 and the PCB (illustrated in FIG. 21H) that contains the circuitry described above in connection with FIG. 13.

Once the housing is formed and the rechargeable battery 40 and circuitry is incorporated into the cavity a separately formed cover plate 390, which includes a nested portion 26, is positioned over the cavity and mechanically attached by clip or snap connections 361/391 that extend longitudinally along the inner surfaces of the rigid panel 360 and cover plate 390. One or more screws received within threaded holes 362 in the rigid panel 360 may also be employed. The cover plate 390 may be permanently attached to the housing components 360 and 370 or removably attached thereto to provide access to the circuitry and/or rechargeable battery 40. The cover plate 390 may be formed of a material that is more rigid than the elastic component 370. It can be formed of a material that is as rigid or more rigid than the rigid component 360. The case 310, like the cases previously described include buttons and ports 16 and 14 to correspond with and engage corresponding buttons and/or ports on the mobile device.

In operation, the flexible bumper 312 and top end region 330 that is formed by the relatively less rigid and more elastic component 370 allow flexibility so that the user can elastically deform the case including the bumper 312 to insert or slip the phone or mobile device into the fully assembled battery case 310. Once inserted, the deformed regions return to the original position to support the mobile device. At the same time, the co-molded rigid panel component 360 provides structural rigidity and impact resistance to protect the circuitry 400 and battery 40 housed within the case 310.

As bested depicted in the exploded view in FIG. 21H, The nested portion 26 in case 310 may be mechanically hinged to the cover plate 390 with hinge pins 395 to allow the nested portion 26 to pivot or hinge outwardly at its bottom end 396 away from the outer surface of the cover plate 390. The hinging of the nested portion can further ease insertion of the mobile device into the plug 28 (e.g., the lightening connector 405). Thus, in use, the user can hinge outwardly the nested portion 26, plug the mobile device into the lightening connector 405, then push the nested portion 26 back into the case 310 and slip the perimeter of the mobile device past the lip region 313 of the bumper 312 by deforming the more elastic component 370 that forms that region and the entirety of the top-end region. Once inserted in the case 310 the internal surfaces of the bumper 312 (and rim 313 thereof) and the external surface of the cover plate 390 firmly and snugly encase and retain the mobile device within the case 310.

An elegant solution is thereby provided to facilitate user insertion, retention, and removal of a mobile device into a form fitting battery case having a unitary construction that includes an integrally molded bumper that extends around the entire perimeter of the case 310. Such a construction is capable of avoiding disassembly and maintaining protection when the case 10 and mobile device retained therein are accidentally dropped.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A user removable protective case for a mobile device, wherein said mobile device includes an internal battery, a charging/sync port, a wireless link capable of establishing a peer-to-peer connection, and processing device capable of executing instructions of software applications, said protective case comprising:
   an enclosure for holding a battery cell;
   a battery charging circuit contained within said protective case, said battery charging circuit comprising:
      a port for receiving battery charging current;
      a connector device configured to be connected to said charging/sync port of said mobile device;
      a current sensor configured to determine current drawn by said mobile device installed in said protective case;
      a switching device coupled to said current sensor, configured to direct battery charging current to said battery cell and said connector device depending on inputs from said current sensor;
      a battery charging device that receives charging current from said switching device;
      a DC-DC convertor that adjusts voltage of battery power input to said connector; and
      a processing device that controls said battery charging circuit;
   a wireless module capable of communicating with said wireless link of said mobile device and said processing device of said battery charging circuit, said wireless module receiving data comprising instructions from a battery software application running on same mobile device, said wireless module providing said instructions to said processing device of said battery charging circuit, said instructions indicating whether said battery charging circuit should supply current from said battery cell to said connector device.

2. The protective case of claim 1, wherein said battery of said protective case can be removed by a user.

3. The protective case of claim 1, wherein said wireless module is a Bluetooth module.

4. The protective case of claim 1, wherein said instructions are determined by whether the battery's capacity is less than a predetermined percentage value.

5. A battery charging device, comprising:
   a housing having a first charging position and a second charging position, each charging position having a respective first charging lead and a second charging lead, each of said first and second charging leads having terminals that correspond to and can mate to terminals on a battery cell that can be inserted into and removed from said first and second charging positions;

a battery charging and control circuit comprising a port for receiving charging current, a first charging circuit and a second charging circuit, said first charging circuit in parallel with said second charging circuit;

a processing device controlling the first charging circuit and second charging circuit; and an external device charging circuit coupled to said second charging circuit, said external device charging circuit capable of supply of current, through a connection port coupled thereto, to an external device.

6. The battery charging device of claim 5, wherein said first charging lead and second charging lead are displaced from each other.

7. The battery charging device of claim 6, wherein said first charging lead is placed on a first printed circuit board while the second charging lead is placed on a second printed circuit board.

8. A protective case for a mobile device, the protective case comprising:

an enclosure for holding a battery cell;

a battery charging circuit contained within the protective case; and a wireless module capable of communicating with a wireless link of the mobile device and the battery charging circuit, wherein when the mobile device is drawing a current that is larger than a predetermined amount, the battery charging circuit directs most of the current to the mobile device, and wherein when the mobile device is drawing current that is small than the predetermined amount, the battery charging circuit directs most of the current to the battery cell.

9. The protective case of claim 8, wherein the predetermined amount of current is 800 mA.

10. A protective battery case for a mobile device, wherein said mobile device includes an internal battery, a charging/sync port, a wireless link capable of establishing a peer-to-peer connection, and processing device capable of executing instructions of software applications, said protective case comprising:

a base having a back surface extending from a top end to a bottom end region and having a mid region therebetween, said base defining an enclosure that houses a battery cell and a battery charging circuit, said battery charging circuit comprising:

a port for receiving battery charging current;

a connector device configured to be connected to said charging/sync port of said mobile device;

a current sensor configured to determine current drawn by said mobile device installed in said protective case;

a switching device coupled to said current sensor, configured to direct battery charging current to said battery cell and said connector device depending on inputs from said current sensor;

a battery charging device that receives charging current from said switching device;

a DC-DC convertor that adjusts voltage of battery power input to said connector;

a processing device that controls said battery charging circuit;

external metal charging terminals; and a wireless module capable of communicating with said wireless link of said mobile device and said processing device of said battery charging circuit, said wireless module receiving data comprising instructions from a battery software application running on same mobile device, said wireless module providing said instructions to said processing device of said battery charging circuit, said instructions indicating whether said battery charging circuit should supply current from said battery cell to said connector device; and wherein said base being comprised of (a) a first component that includes the top end region and a perimeter bumper region that extending around the entire perimeter of the case defined by said top, bottom and mid-regions of the base, and (b) a second component that includes the mid-region of the base, and wherein said first and said second components are co-molded into a unitary structure and said first component is formed of a material that is more elastic and less rigid than the material that forms the second component.

11. The battery case of claim 10 further comprising a cover plate that is attached to the base to cover the battery housed therein.

12. The battery case of claim 11 further comprising a nested region positioned at the bottom end region of the case within the perimeter of the bumper, said nested region including a plug adapted to be inserted into the charging/sync port of the mobile device.

13. The battery case of claim 12, wherein said nested portion is attached to said cover plate and is adapted to being hinged outwardly away from said cover plate.

14. The battery case of claim 13 further being part of a charging kit having a dock that includes a bottom surface that is configured to rest on a flat support surface and a top surface that includes a cavity contoured to conform with the external shape of the bottom end region of the battery case.

15. The battery case of claim 14, wherein said cavity is adapted to receive the bottom end region of the battery case and support the battery case in an upright position so that the area extending between the nested portion and the top end region is visible.

16. The battery case of claim 15, wherein said dock includes metal charging terminals that are located in the cavity and positioned to correspond and be in contact with the external charging terminals on the battery case.

* * * * *